(12) United States Patent
Sawaguchi

(10) Patent No.: US 12,466,881 B2
(45) Date of Patent: *Nov. 11, 2025

(54) PRE-FILLED SYRINGE AND METHOD OF PRODUCING PRE-FILLED SYRINGE

(71) Applicant: ZEON CORPORATION, Tokyo (JP)

(72) Inventor: Taichi Sawaguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 17/261,870

(22) PCT Filed: Jul. 24, 2019

(86) PCT No.: PCT/JP2019/029094
§ 371 (c)(1),
(2) Date: Jan. 21, 2021

(87) PCT Pub. No.: WO2020/026927
PCT Pub. Date: Feb. 6, 2020

(65) Prior Publication Data
US 2021/0292402 A1    Sep. 23, 2021

(30) Foreign Application Priority Data

Jul. 31, 2018  (JP) ................. 2018-143856
Oct. 4, 2018   (JP) ................. 2018-189474

(51) Int. Cl.
C07K 16/24   (2006.01)
A61K 9/00    (2006.01)
A61K 47/26   (2006.01)
A61M 5/31    (2006.01)

(52) U.S. Cl.
CPC ......... *C07K 16/241* (2013.01); *A61M 5/3129* (2013.01); *A61K 9/0019* (2013.01); *A61K 47/26* (2013.01); *A61M 2207/00* (2013.01); *C07K 2317/21* (2013.01); *C07K 2317/24* (2013.01)

(58) Field of Classification Search
CPC .................................................. A61M 5/28
See application file for complete search history.

(56) References Cited

U.S. PATENT DOCUMENTS

| | | | | |
|---|---|---|---|---|
| 7,253,142 | B1* | 8/2007 | Suzuki ............ | A61K 47/02 530/386 |
| 2017/0197024 | A1* | 7/2017 | Kiminami ......... | A61K 9/08 |
| 2018/0318513 | A1 | 11/2018 | Maruyama et al. | |
| 2021/0260297 | A1 | 8/2021 | Sawaguchi | |

FOREIGN PATENT DOCUMENTS

| | | |
|---|---|---|
| CN | 107106409 A | 8/2017 |
| DE | 1604889 C3 | 4/1974 |
| EP | 3831429 A1 | 6/2021 |
| JP | 2006116345 A | 5/2006 |
| JP | 2008093830 A | 4/2008 |
| JP | 3150720 U | 5/2009 |
| JP | 2011168610 A | 9/2011 |
| JP | 2012029918 A | 2/2012 |
| JP | 5271481 B2 | 8/2013 |
| JP | 5444835 B2 | 3/2014 |
| JP | 2014051502 A | 3/2014 |
| JP | 2016056176 A | 4/2016 |
| JP | 2016059635 A | 4/2016 |
| JP | 2016155327 A | 9/2016 |
| JP | 6076226 B2 | 2/2017 |
| JP | 2018070784 A | 5/2018 |
| WO | 2016051962 A1 | 4/2016 |
| WO | 2017087798 A1 | 5/2017 |
| WO | 2017087871 A1 | 5/2017 |
| WO | 2017126550 A1 | 7/2017 |

OTHER PUBLICATIONS

Yamazaki, M., Industrialization and application development of cyclo-olefin polymer, 2004, Journal of Molecular Catalysis A: Chemical, vol. 213, 81-87 (Year: 2004).*
Suzuki, S. et al., Introduction to Cyclo Olefin Polymer, 2016, Zeon Coporation (Year: 2016).*
Law, K.-Y., Definitions for hydrophilicity, hydrophobicity, and superhydrophobicity: getting the basics right, Feb. 20, 2014, Journal of Physical Chemistry Letters, vol. 5, 686-688 (Year: 2014).*
Jan. 12, 2024, Office Action issued by the Intellectual Property India in the corresponding Indian Patent Application No. 202137002722.
Feb. 2, 2021, International Preliminary Report on Patentability issued in the International Patent Application No. PCT/JP2019/029094.
Nov. 24, 2021, the Extended European Search Report issued by the European Patent Office in the corresponding European Patent Application No. 19843345.0.

(Continued)

*Primary Examiner* — Bethany P Barham
*Assistant Examiner* — Paul Hoerner
(74) *Attorney, Agent, or Firm* — KENJA IP LAW PC

(57) ABSTRACT

Provided is a pre-filled syringe that can inhibit protein aggregation in a protein solution formulation while also reducing the produced amount of a decomposition product of a non-ionic surfactant after long-term storage. The pre-filled syringe includes: a barrel formed of a resin containing a hydrogenated cycloolefin ring-opened polymer and/or a copolymer of a cycloolefin and a chain olefin; a sealing member sealing a nozzle of the barrel; a gasket housed inside the barrel; and a plunger performing a movement operation of the gasket, and contains a protein solution formulation in a space defined by the sealing member, the gasket, and a region that is part of an inner wall surface of the barrel. The protein solution formulation has a non-ionic surfactant concentration of more than 0 mg/mL and less than 0.05 mg/mL.

12 Claims, 1 Drawing Sheet

(56) References Cited

OTHER PUBLICATIONS

Sep. 3, 2019, International Search Report issued in the International Patent Application No. PCT/JP2019/029094.

Aug. 4, 2022, Office Action issued by the Intellectual Property India in the corresponding Indian Patent Application No. 202137002722.

Alexander Kolev, Heißprägen von Verbundfolien für mikrofluidische Anwendungen, 2012, KIT Scientific Publishing.

Aug. 26, 2025, Communication of a notice of opposition issued by the European Patent Office in the corresponding European Patent No. 3831428.

Japanese Patent Application No. 2018-143855 filed on Jul. 31, 2018 in the name of Zeon Corporation which corresponds to US20210260297A1.

Sep. 2, 2025, Brief Communication issued by the European Patent Office in the corresponding European Patent No. 3831428.

Topas Advanced Polymers GMBH, Broschüre Topas, Cylic Olefin Copolymer (COC), 2006.

* cited by examiner

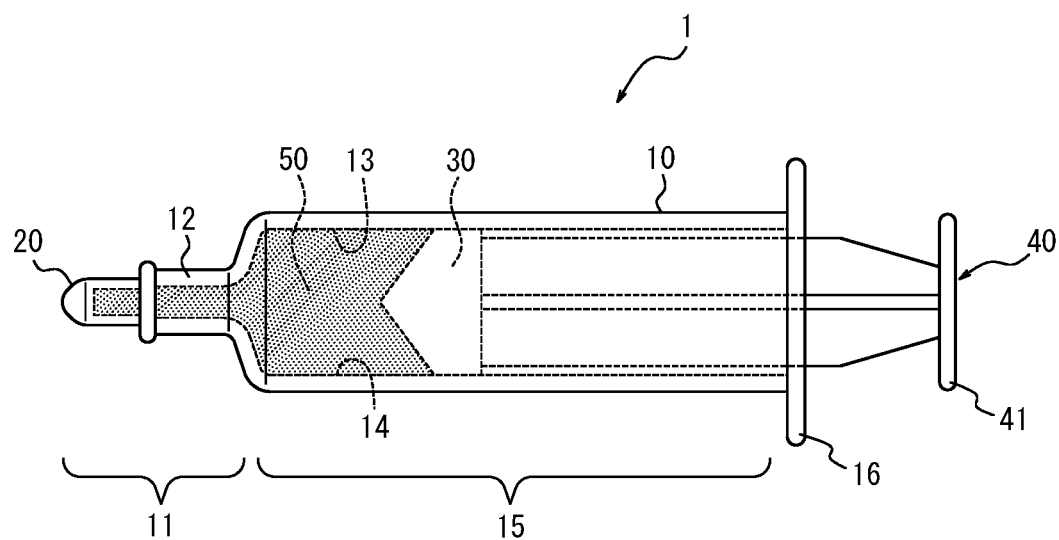

PRE-FILLED SYRINGE AND METHOD OF PRODUCING PRE-FILLED SYRINGE

TECHNICAL FIELD

The present disclosure relates to a pre-filled syringe and a method of producing a pre-filled syringe.

BACKGROUND

Pre-filled syringes that are obtained by filling syringes with injection liquids in advance have been increasingly used in recent years because such pre-filled syringes are extremely convenient to use and can prevent medical accidents such as the mistaken use of an injection liquid.

The injection liquid with which a pre-filled syringe is filled may, for example, be a formulation that contains a protein in an aqueous solution (protein solution formulation). A problem faced by pre-filled syringes that are filled with protein solution formulations such as described above is that protein aggregation may occur during long-term storage.

In response to this problem, Patent Literature (PTL) 1, for example, proposes a technique in which the protein concentration in a protein solution formulation that contains erythropoietin as a protein is set within a specific range, in which a non-ionic surfactant and a tonicity agent are included in the formulation, and in which a vessel having a hydrophobic resin selected from 1) a cycloolefin copolymer that is a copolymer of a cycloolefin and an olefin, 2) a cycloolefin ring-opened polymer, and 3) a product obtained through hydrogenation of a cycloolefin ring-opened polymer as the material of a part that is in direct contact with the formulation is used as a vessel that is filled with the formulation. Polysorbate 80 and polysorbate 20, for example, are used as the non-ionic surfactant in PTL 1. The non-ionic surfactant can function as a stabilizer for erythropoietin (i.e., the protein).

CITATION LIST

Patent Literature

PTL 1: JP6076226B2

SUMMARY

Technical Problem

However, non-ionic surfactants such as polysorbate 80 and polysorbate 20 may decompose in a protein solution formulation during long-term storage of a pre-filled syringe, leading to production of decomposition products. Such decomposition products have drawbacks in terms that they are carcinogenic and may lead to problems such as hypersensitivity and chromosome abnormalities upon administration to a human body.

In other words, the conventional pre-filled syringe described above leaves room for further improvement in terms of inhibiting protein aggregation in a protein solution formulation while also suppressing production of a decomposition product of a non-ionic surfactant during long-term storage.

Accordingly, one object of the present disclosure is to provide a pre-filled syringe that can inhibit protein aggregation in a protein solution formulation after long-term storage while also reducing the produced amount of a decomposition product of a non-ionic surfactant after long-term storage.

Another object of the present disclosure is to provide a method of producing a pre-filled syringe that can inhibit protein aggregation in a protein solution formulation after long-term storage while also reducing the produced amount of a decomposition product of a non-ionic surfactant after long-term storage.

Solution to Problem

The inventor conducted diligent studies with the aim of solving the problems set forth above. The inventor discovered that by filling a syringe including a barrel formed using a specific resin with a protein solution formulation having a non-ionic surfactant concentration within a specific range to produce a pre-filled syringe, it is possible to inhibit protein aggregation in the protein solution formulation and to reduce the produced amount of a decomposition product of the non-ionic surfactant even in a situation in which the pre-filled syringe is stored for a long time. In this manner, the inventor completed the present disclosure.

Specifically, the present disclosure aims to advantageously solve the problems set forth above, and a presently disclosed pre-filled syringe comprises: a barrel including a nozzle at a tip thereof; a sealing member sealing the nozzle; a gasket slidably housed inside the barrel; a plunger linked to the gasket and performing a movement operation of the gasket in a longitudinal direction of the barrel; and a protein solution formulation filled into a space defined by the sealing member, the gasket, and a region that is part of an inner wall surface of the barrel, wherein the barrel is formed of a resin containing either or both of a hydrogenated cycloolefin ring-opened polymer and a copolymer of a cycloolefin and a chain olefin, and the protein solution formulation has a non-ionic surfactant concentration of more than 0 mg/mL and less than 0.05 mg/mL. In a pre-filled syringe in which a syringe including a barrel formed from a resin containing a hydrogenated cycloolefin ring-opened polymer and/or a copolymer of a cycloolefin and a chain olefin is filled with a protein solution formulation having a non-ionic surfactant concentration of more than 0 mg/mL and less than 0.05 mg/mL in this manner, protein aggregation in the protein solution formulation is inhibited and the produced amount of a decomposition product of the non-ionic surfactant is low even in a situation in which the pre-filled syringe is stored for a long time.

In the presently disclosed pre-filled syringe, the region that is part of the inner wall surface preferably has a water contact angle of 90° or more. A pre-filled syringe that includes a barrel in which a region that is part of an inner wall surface that is in contact with a protein solution formulation (hereinafter, also referred to as a "formulation contacting region") has a water contact angle of 90° or more can further inhibit protein aggregation in the protein solution formulation in a situation in which the pre-filled syringe is stored for a long time.

Note that the "water contact angle" of a formulation contacting region referred to in the present disclosure can be measured by a method described in the EXAMPLES section of the present specification.

In the presently disclosed pre-filled syringe, the protein solution formulation can contain either or both of an antibody and an antigen binding fragment of the antibody.

Moreover, in the presently disclosed pre-filled syringe, the antibody can be at least one selected from the group consisting of chimeric antibodies, human antibodies, humanized antibodies, and domain antibodies of any thereof.

Furthermore, in the presently disclosed pre-filled syringe, the protein solution formulation can contain at least one selected from the group consisting of ofatumumab, cetuximab, tocilizumab, bevacizumab, canakinumab, golimumab, ustekinumab, eculizumab, omalizumab, trastuzumab, pertuzumab, adalimumab, denosumab, mogamulizumab, rituximab, ranibizumab, infliximab, aflibercept, abatacept, etanercept, gemtuzumab ozogamicin, panitumumab, basiliximab, certolizumab pegol, and palivizumab.

Moreover, the present disclosure aims to advantageously solve the problems set forth above, and a presently disclosed method of producing a pre-filled syringe is a method of producing a pre-filled syringe having a protein solution formulation filled into an inner part of a syringe that includes: a barrel including a nozzle at a tip thereof; a sealing member sealing the nozzle; a gasket slidably housed inside the barrel; and a plunger linked to the gasket and performing a movement operation of the gasket in a longitudinal direction of the barrel, the method of producing a pre-filled syringe comprising a step of loading a protein solution formulation having a non-ionic surfactant concentration of more than 0 mg/mL and less than 0.05 mg/mL into a barrel that is formed of a resin containing either or both of a hydrogenated cycloolefin ring-opened polymer and a copolymer of a cycloolefin and a chain olefin to obtain a pre-filled syringe having the protein solution formulation filled into a space defined by the sealing member, the gasket, and a region that is part of an inner wall surface of the barrel. By filling a syringe that includes a barrel formed from a resin containing a hydrogenated cycloolefin ring-opened polymer and/or a copolymer of a cycloolefin and a chain olefin with a protein solution formulation having a non-ionic surfactant concentration of more than 0 mg/mL and less than 0.05 mg/mL in this manner, protein aggregation in the protein solution formulation can be inhibited and the produced amount of a decomposition product of the non-ionic surfactant can be reduced in a situation in which the obtained pre-filled syringe is stored for a long time.

In the presently disclosed method of producing a pre-filled syringe, the region that is part of the inner wall surface preferably has a water contact angle of 90° or more. By using a barrel in which the water contact angle of a formulation contacting region is 90° or more, protein aggregation in the protein solution formulation can be further inhibited in a situation in which the obtained pre-filled syringe is stored for a long time.

The presently disclosed method of producing a pre-filled syringe preferably further comprises, in advance of the step of obtaining the pre-filled syringe: a step of pre-drying the resin; and a step of shaping the resin after the 10) pre-drying to obtain the barrel. By using a barrel that is obtained through shaping of a resin that has been pre-dried, protein aggregation in the protein solution formulation can be further inhibited in a situation in which the obtained pre-filled syringe is stored for a long time.

In the presently disclosed method of producing a pre-filled syringe, the resin preferably has an oxygen concentration of 10 mass ppm or less after the pre-drying. When the oxygen concentration in the pre-dried resin is 10 mass ppm or less, protein aggregation in the protein solution formulation can be even further inhibited in a situation in which the obtained pre-filled syringe is stored for a long time.

Note that the "oxygen concentration" in a resin referred to in the present disclosure can be measured by a method described in the EXAMPLES section of the present specification.

In the presently disclosed method of producing a pre-filled syringe, the pre-drying is preferably performed in an inert gas atmosphere. By performing pre-drying of the resin in an inert gas atmosphere, protein aggregation in the protein solution formulation can be even further inhibited in a situation in which the obtained pre-filled syringe is stored for a long time.

In the presently disclosed method of producing a pre-filled syringe, the pre-drying preferably has a drying temperature of not lower than 80° C. and not higher than 120° C. By performing pre-drying of the resin at a temperature within the range set forth above, protein aggregation in the protein solution formulation can be even further inhibited in a situation in which the obtained pre-filled syringe is stored for a long time.

In the presently disclosed method of producing a pre-filled syringe, the protein solution formulation can contain either or both of an antibody and an antigen binding fragment of the antibody.

Moreover, in the presently disclosed method of producing a pre-filled syringe, the antibody can be at least one selected from the group consisting of chimeric antibodies, human antibodies, humanized antibodies, and domain antibodies of any thereof.

Furthermore, in the presently disclosed method of producing a pre-filled syringe, the protein solution formulation can contain at least one selected from the group consisting of ofatumumab, cetuximab, tocilizumab, bevacizumab, canakinumab, golimumab, ustekinumab, eculizumab, omalizumab, trastuzumab, pertuzumab, adalimumab, denosumab, mogamulizumab, rituximab, ranibizumab, infliximab, aflibercept, abatacept, etanercept, gemtuzumab ozogamicin, panitumumab, basiliximab, certolizumab pegol, and palivizumab.

Advantageous Effect

According to the present disclosure, it is possible to provide a pre-filled syringe that can inhibit protein aggregation in a protein solution formulation after long-term storage while also reducing the produced amount of a decomposition product of a non-ionic surfactant after long-term storage.

Moreover, according to the present disclosure, it is possible to provide a method of producing a pre-filled syringe that can inhibit protein aggregation in a protein solution formulation after long-term storage while also reducing the produced amount of a decomposition product of a non-ionic surfactant after long-term storage.

BRIEF DESCRIPTION OF THE DRAWING

In the Accompanying Drawing,

FIG. 1 illustrates schematic configuration of one example of a pre-filled syringe in accordance with the present disclosure.

DETAILED DESCRIPTION

The following provides a detailed description of embodiments of the present disclosure.

The presently disclosed pre-filled syringe has a protein solution formulation filled into an inner part of a syringe.

Moreover, the presently disclosed pre-filled syringe can be produced by the presently disclosed method of producing a pre-filled syringe, for example.

(Pre-Filled Syringe)

The presently disclosed pre-filled syringe includes: a barrel including a nozzle at a tip thereof; a sealing member sealing the nozzle; a gasket slidably housed in the barrel; and a plunger linked to the gasket and performing a movement operation of the gasket in a longitudinal direction of the barrel. A protein solution formulation is filled into a space defined by the sealing member, the gasket, and a formulation contacting region that is part of an inner wall surface of the barrel.

The following describes one example of the structure of the presently disclosed pre-filled syringe set forth above with reference to the drawing. A pre-filled syringe 1 illustrated in FIG. 1 includes a barrel 10, a sealing member (cap in FIG. 1) 20, a gasket 30, a plunger 40, and a protein solution formulation 50. The barrel 10 includes a nozzle 12 at a tip 11 thereof. The sealing member 20 is fitted to the nozzle 12. The gasket 30 can slide inside the barrel 10 in a longitudinal direction of the barrel 10 and this sliding of the gasket 30 can be performed through the plunger 40 that is linked to the gasket 30. The protein solution formulation 50 is filled into a space defined by the sealing member 20, the gasket 30, and a formulation contacting region 14 that is a region that is part of an inner wall surface 13 of the barrel 10.

Features of the presently disclosed pre-filled syringe are that the protein solution formulation with which the pre-filled syringe is filled has a non-ionic surfactant concentration of more than 0 mg/mL and less than 0.05 mg/mL and that the barrel is obtained through shaping of a resin containing a hydrogenated cycloolefin ring-opened polymer and/or a copolymer of a cycloolefin and a chain olefin.

The presently disclosed pre-filled syringe can inhibit protein aggregation in the protein solution formulation even in a situation in which the pre-filled syringe is stored for a long time and can also limit the amount of a decomposition product of the non-ionic surfactant that is produced after long-term storage to a low level. It is presumed that such an effect is obtained for the following reason.

Specifically, the presently disclosed pre-filled syringe is filled with a protein solution formulation having a non-ionic surfactant concentration of more than 0 mg/mL and less than 0.05 mg/mL. The non-ionic surfactant that is contained as an essential component of the protein solution formulation functions as a stabilizer for a protein. On the other hand, even in a situation in which decomposition of the non-ionic surfactant occurs, the amount of a decomposition product of the non-ionic surfactant that is produced can be limited to a low level as a result of the protein solution formulation having a low non-ionic surfactant concentration of less than 0.05 mg/mL.

In addition, in the presently disclosed pre-filled syringe, the protein solution formulation set forth above is filled into a barrel that is obtained through shaping of a resin containing a hydrogenated cycloolefin ring-opened polymer and/or a copolymer of a cycloolefin and a chain olefin. It is presumed that a barrel that is a shaped product of the specific resin set forth above has reduced affinity between a formulation contacting region thereof and a protein due to the hydrophobic nature of the resin set forth above, and thus adsorption of the protein to the formulation contacting region can be inhibited, and aggregation of the protein in the formulation contacting region (i.e., on an inner wall surface of the barrel) can be inhibited. The contribution of the resin described above is thought to act in combination with the contribution of the previously mentioned non-ionic surfactant as a stabilizer to thereby enable inhibition of protein aggregation in the protein solution formulation even in a situation in which the pre-filled syringe is stored for a long time.

The following describes the protein solution formulation with which the presently disclosed pre-filled syringe is filled and the syringe (barrel, sealing member, gasket, and plunger) that is a constituent of the presently disclosed pre-filled syringe with reference to FIG. 1, as necessary.

<Protein Solution Formulation>

The protein solution formulation contains at least a protein, a non-ionic surfactant, and water and has a non-ionic surfactant concentration of more than 0 mg/mL and less than 0.05 mg/mL.

<<Protein>>

The protein contained in the protein solution formulation is not specifically limited and may, for example, be an antibody (chimeric antibody, human antibody, humanized antibody, or domain antibody of any thereof) or an antigen binding fragment of the antibody.

More specific examples of the protein include ofatumumab (product name: Arzerra® (Arzerra is a registered trademark in Japan, other countries, or both)), cetuximab (product name: Erbitux® (Erbitux is a registered trademark in Japan, other countries, or both)), tocilizumab (product name: Actemra® (Actemra is a registered trademark in Japan, other countries, or both)), bevacizumab (product name: Avastin® (Avastin is a registered trademark in Japan, other countries, or both)), canakinumab (product name: Ilaris® (Ilaris is a registered trademark in Japan, other countries, or both)), golimumab (product name: Simponi® (Simponi is a registered trademark in Japan, other countries, or both)), ustekinumab (product name: Stelara® (Stelara is a registered trademark in Japan, other countries, or both)), eculizumab (product name: Soliris® (Soliris is a registered trademark in Japan, other countries, or both)), omalizumab (product name: Xolair® (Xolair is a registered trademark in Japan, other countries, or both)), trastuzumab (product name: Herceptin® (Herceptin is a registered trademark in Japan, other countries, or both)), pertuzumab (product name: Perjeta® (Perjeta is a registered trademark in Japan, other countries, or both)), adalimumab (product name: Humira® (Humira is a registered trademark in Japan, other countries, or both)), denosumab (product name: Prolia® (Prolia is a registered trademark in Japan, other countries, or both); product name: Ranmark® (Ranmark is a registered trademark in Japan, other countries, or both)), mogamulizumab (product name: Poteligeo® (Poteligeo is a registered trademark in Japan, other countries, or both)), rituximab (product name: Rituxan® (Rituxan is a registered trademark in Japan, other countries, or both)), ranibizumab (product name: Lucentis® (Lucentis is a registered trademark in Japan, other countries, or both)), infliximab (product name: Remicade® (Remicade is a registered trademark in Japan, other countries, or both)), aflibercept (product name: Eylea® (Eylea is a registered trademark in Japan, other countries, or both)), abatacept (product name: Orencia® (Orencia is a registered trademark in Japan, other countries, or both)), etanercept (product name: Enbrel® (Enbrel is a registered trademark in Japan, other countries, or both)), gemtuzumab ozogamicin (product name: Mylotarg® (Mylotarg is a registered trademark in Japan, other countries, or both)), panitumumab (product name: Vectibix® (Vectibix is a registered trademark in Japan, other countries, or both)), basiliximab (product name: Simulect® (Simulect is a registered trademark in Japan, other countries, or both)), certolizumab pegol (product name: Cimzia® (Cimzia is a registered trademark in Japan, other countries, or both)), and palivizumab (product name: Synagis® (Synagis is a registered trademark in Japan, other countries, or both)).

Note that the protein solution formulation may contain one type of protein or may contain two or more types of proteins. In other words, the protein solution formulation may contain both an antibody and an antigen binding fragment, may contain two or more types of antibodies, or may contain two or more types of antigen binding fragments, for example.

The concentration of the protein in the protein solution formulation is preferably 0.005 mg/mL or more, more preferably 0.01 mg/mL or more, and even more preferably 0.05 mg/mL or more, and is preferably 500 mg/mL or less, more preferably 300 mg/mL or less, and even more preferably 200 mg/mL or less. When the concentration of the protein in the protein solution formulation is 0.005 mg/mL or more, the expected effect of the protein can be sufficiently obtained when the protein solution formulation is administered to a human body or the like. Moreover, when the concentration of the protein in the protein solution formulation is 500 mg/mL or less, aggregation of the protein in the protein solution formulation can be further inhibited during long-term storage of the pre-filled syringe.

<<Non-Ionic Surfactant>>

The non-ionic surfactant is a component that can function as a stabilizer for stabilizing the protein described above. Examples of such non-ionic surfactants include, but are not specifically limited to, sorbitan fatty acid esters, glycerin fatty acid esters, polyglycerin fatty acid esters, polyoxyethylene sorbitan fatty acid esters (polyoxyethylene sorbitan oleate (polysorbate 80), polyoxyethylene sorbitan monolaurate (polysorbate 20), etc.), polyoxyethylene sorbitol fatty acid esters, polyoxyethylene glycerin fatty acid esters, polyoxyethylene fatty acid esters, polyoxyethylene alkyl ethers, polyoxyethylene polyoxypropylene alkyl ethers, polyoxyethylene alkyl phenyl ethers, polyoxyethylene hydrogenated castor oil, polyoxyethylene beeswax derivatives, polyoxyethylene lanolin derivatives, and polyoxyethylene fatty acid amides.

Note that one non-ionic surfactant may be used individually, or two or more non-ionic surfactants may be used in combination.

The concentration of the non-ionic surfactant in the protein solution formulation is required to be more than 0 mg/mL and less than 0.05 mg/mL, is preferably 0.005 mg/mL or more, and more preferably 0.01 mg/mL or more, and is preferably 0.045 mg/mL or less, and more preferably 0.04 mg/mL or less. When the non-ionic surfactant concentration in a protein solution formulation is 0 mg/mL (i.e., when the protein solution formulation does not contain a non-ionic surfactant), it is not possible to inhibit protein aggregation in the protein solution formulation during long-term storage of a pre-filled syringe. On the other hand, when the non-ionic surfactant concentration in a protein solution formulation is 0.05 mg/mL or more, the amount of a decomposition product of the non-ionic surfactant that is produced during long-term storage of a pre-filled syringe cannot be limited to a low level.

Note that in a case in which the non-ionic surfactant is a non-ionic surfactant that includes a polyoxyethylene chain (polyoxyethylene sorbitan fatty acid ester, polyoxyethylene sorbitol fatty acid ester, polyoxyethylene glycerin fatty acid ester, polyoxyethylene fatty acid ester, polyoxyethylene alkyl ether, polyoxyethylene polyoxypropylene alkyl ether, polyoxyethylene alkyl phenyl ether, polyoxyethylene hydrogenated castor oil, polyoxyethylene beeswax derivative, polyoxyethylene lanolin derivative, polyoxyethylene fatty acid amide, etc.), for example, the decomposition product referred to above may be a decomposition product that is produced through severing of the end of the polyoxyethylene chain due to self-oxidation thereof.

<<Other Components>>

The protein solution formulation may contain components other than a protein, water, and a non-ionic surfactant (i.e., other components). Examples of other components that are optionally contained in the protein solution formulation include known components that can be used in production of protein solution formulations. Examples of such known components include stabilizers (excluding the non-ionic surfactants described above), diluents, solubilizers, tonicity agents, excipients, pH modifiers, numbing agents, buffering agents, sulfur-containing reducing agents, and antioxidants. Further examples of other components include inorganic salts such as sodium chloride, potassium chloride, calcium chloride, sodium phosphate, potassium phosphate, and sodium hydrogen carbonate; and organic salts such as sodium citrate, potassium citrate, and sodium acetate. Note that the inorganic salt concentration in the protein solution formulation is preferably 300 mM or less. Moreover, the organic salt concentration in the protein solution formulation is preferably 300 mM or less.

<<Production Method>>

No specific limitations are placed on the method by which the protein solution formulation is produced so long as it is possible to obtain a protein solution formulation in which at least a protein is dissolved and in which the non-ionic surfactant concentration is within a specific range. For example, the protein solution formulation can be obtained by dissolving the protein and a surfactant that is used as necessary in an aqueous buffer solution such as an acetate buffer solution, a phosphate buffer solution, or a citrate buffer solution.

The pH of the obtained protein solution formulation is not specifically limited and can be not lower than 3.0 and not higher than 8.0.

<Barrel>

The barrel included in the presently disclosed pre-filled syringe is a member that includes a nozzle at a tip thereof and that can house the protein solution formulation and the gasket in an inner part thereof. In the pre-filled syringe 1 illustrated in FIG. 1, for example, the barrel 10 includes a barrel main body 15, a nozzle 12 disposed at a tip end (tip 11) of the barrel main body 15, and a flange 16 disposed at a base end of the barrel main body 15.

The barrel main body 15 is a tube-shaped part that houses the gasket 30 in a liquid-tight and slidable manner.

The nozzle 12 is a tube-shaped part that has a smaller diameter than the barrel main body 15. The nozzle 12 includes an opening at the tip thereof for expelling the protein solution formulation 50 inside the barrel 10.

The barrel 10 is in contact with the protein solution formulation 50 in a formulation contacting region 14 that is part of an inner wall surface 13 in the barrel main body 15 and the nozzle 12.

The barrel is a shaped product of a resin that contains either or both of a hydrogenated cycloolefin ring-opened polymer and a copolymer of a cycloolefin and a chain olefin. Note that the resin used to form the barrel may contain components other than the hydrogenated cycloolefin ring-opened polymer and the copolymer of a cycloolefin and a chain olefin mentioned above (i.e., other components).

<<Hydrogenated Cycloolefin Ring-Opened Polymer>>

The hydrogenated cycloolefin ring-opened polymer is a polymer that is obtained by performing ring-opening polymerization of a cycloolefin as a monomer to obtain a cycloolefin ring-opened polymer, and then further subjecting the obtained cycloolefin ring-opened polymer to a hydrogenation reaction.

[Cycloolefin Ring-Opened Polymer]

A compound that has a cyclic structure formed of carbon atoms and includes a polymerizable carbon-carbon double bond in the cyclic structure can be used as a cycloolefin serving as a monomer in production of the cycloolefin ring-opened polymer. Specifically, the cycloolefin serving as a monomer may be a norbornene-based monomer (monomer including a norbornene ring) or a monocyclic cycloolefin monomer. Note that in a "norbornene ring" included in a norbornene-based monomer, one or a plurality of carbon atoms may be interposed between carbon-carbon single bonds that form the ring structure, and these interposed carbon atoms may form single bonds with one another, resulting in the formation of a new ring structure in the norbornene ring.

Examples of Norbornene-Based Monomers Include:

bicyclic monomers such as bicyclo[2.2.1]hept-2-ene (common name: norbornene) and derivatives thereof (derivatives including a substituent on a ring; same applies below), and 5-ethylidene-bicyclo[2.2.1]hept-2-ene (common name: ethylidene norbornene) and derivatives thereof;

tricyclic monomers such as tricyclo[4.3.0.1$^{2,5}$]deca-3,7-diene (common name: dicyclopentadiene) and derivatives thereof; and tetracyclic monomers such as 7,8-benzotricyclo[4.3.0.1$^{2,5}$]dec-3-ene (common name: methanotetrahydrofluorene and derivatives thereof; also referred to as tetracyclo[7.4.0.0$^{2,7}$0.1$^{10,13}$]trideca-2,4,6,11-tetraene) and derivatives thereof, tetracyclo[4.4.0.1$^{2,5}$0.1$^{7,10}$]dodec-3-ene (common name: tetracyclododecene) and derivatives thereof (for example, 8-methyl-tetracyclo[4.4.0.1$^{2,5}$0.1$^{7,10}$]dodec-3-ene and 8-ethyl-tetracyclo[4.4.0.1$^{2,5}$0.1$^{7,10}$]dodec-3-ene), and 8-ethylidenetetracyclo[4.4.0.1$^{2,5}$. 1$^{7,10}$]-3-dodecene and derivatives thereof.

Examples of possible substituents of the aforementioned derivatives include alkyl groups such as a methyl group and an ethyl group; alkenyl groups such as a vinyl group; alkylidene groups such as an ethylidene group and a propan-2-ylidene group; aryl groups such as a phenyl group; a hydroxy group; an acid anhydride group; a carboxyl group; and alkoxycarbonyl groups such as a methoxycarbonyl group.

Examples of monocyclic cycloolefin monomers include cyclic monoolefins such as cyclobutene, cyclopentene, methylcyclopentene, cyclohexene, methylcyclohexene, cycloheptene, and cyclooctene; and cyclic diolefins such as cyclohexadiene, methylcyclohexadiene, cyclooctadiene, methylcyclooctadiene, and phenylcyclooctadiene.

One of the cycloolefins described above may be used individually, or two or more of the cycloolefins described above may be used in combination. Note that in a case in which two or more cycloolefins are used, the cycloolefin ring-opened polymer may be a block copolymer or may be a random copolymer.

Of these examples, norbornene-based monomers are preferable, tricyclo[4.3.0.1$^{2,5}$]deca-3,7-diene and derivatives thereof, tetracyclo[4.4.0.1$^{2,5}$0.1$^{7,10}$]dodec-3-ene and derivatives thereof, and 7,8-benzotricyclo[4.3.0.1$^{2,5}$]dec-3-ene and derivatives thereof are more preferable, and tricyclo[4.3.0.1$^{2,5}$]deca-3,7-diene, tetracyclo[4.4.0.1$^{2,5}$0.1$^{7,10}$]dodec-3-ene, and 7,8-benzotricyclo[4.3.0.1$^{2,5}$]dec-3-ene are even more preferable as the cycloolefin.

Although no specific limitations are placed on the amount of a norbornene-based monomer that is used in production of the cycloolefin ring-opened polymer, the amount of the norbornene-based monomer per 100 mass % of the amount of all cycloolefin used in production of the cycloolefin ring-opened polymer is preferably 80 mass % or more, more preferably 90 mass % or more, and even more preferably 100 mass % (i.e., the cycloolefin ring-opened polymer is even more preferably a polymer obtained using only one or more norbornene-based monomers as monomers).

No specific limitations are placed on the method by which the cycloolefin ring-opened polymer is produced. For example, a known method in which a cycloolefin such as described above that is used as a monomer is ring-opening polymerized using a metathesis polymerization catalyst can be adopted. This method may, for example, be a method described in JP2016-155327A.

The weight-average molecular weight (Mw) of the cycloolefin ring-opened polymer obtained as set forth above is not specifically limited but is preferably 10,000 or more, and more preferably 15,000 or more, and is preferably 100,000 or less, and more preferably 50,000 or less. When the weight-average molecular weight of the cycloolefin ring-opened polymer is 10,000 or more, it is possible to ensure sufficient strength of a barrel obtained through shaping of a resin that contains a hydrogenated product of the cycloolefin ring-opened polymer. On the other hand, when the weight-average molecular weight of the cycloolefin ring-opened polymer is 100,000 or less, it is possible to ensure sufficient formability of a resin that contains a hydrogenated product of the cycloolefin ring-opened polymer.

Moreover, the molecular weight distribution (Mw/Mn) of the cycloolefin ring-opened polymer is not specifically limited but is preferably not less than 1 and not more than 5, and more preferably not less than 1 and not more than 4. When the molecular weight distribution of the cycloolefin ring-opened polymer is within any of the ranges set forth above, a barrel having sufficient mechanical strength can be obtained.

Note that the weight-average molecular weight (Mw) and number-average molecular weight (Mn) of a polymer such as a cycloolefin ring-opened polymer referred to in the present disclosure are standard polyisoprene-equivalent values according to gel permeation chromatography (GPC) with cyclohexane as an eluent.

[Hydrogenation Reaction]

The hydrogenated cycloolefin ring-opened polymer can be obtained by subjecting the cycloolefin ring-opened polymer described above to a hydrogenation reaction. No specific limitations are placed on the method by which the cycloolefin ring-opened polymer is hydrogenated. For example, a known method in which hydrogen is supplied into a reaction system in the presence of a hydrogenation catalyst can be adopted. This method may, for example, be a method described in JP2016-155327A.

The percentage hydrogenation in the hydrogenation reaction (proportion of main chain carbon-carbon double bonds that are hydrogenated) is not specifically limited but is preferably 70% or more, more preferably 80% or more, even more preferably 90% or more, and particularly preferably 99% or more from a viewpoint of inhibiting the occurrence of burns and oxidative degradation during production of a barrel through shaping of the hydrogenated cycloolefin ring-opened polymer.

Note that the "percentage hydrogenation" in a hydrogenation reaction referred to in the present disclosure can be measured by nuclear magnetic resonance (NMR).

The weight-average molecular weight (Mw) of the hydrogenated cycloolefin ring-opened polymer obtained after the hydrogenation reaction described above is not specifically limited but is preferably 10,000 or more, and more preferably 15,000 or more, and is preferably 100,000 or less, and more preferably 50,000 or less. When the weight-average molecular weight of the hydrogenated cycloolefin ring-opened polymer is 10,000 or more, it is possible to ensure sufficient strength of a barrel obtained through shaping of a resin that contains the hydrogenated cycloolefin ring-opened polymer. On the other hand, when the weight-average molecular weight of the hydrogenated cycloolefin ring-opened polymer is 100,000 or less, it is possible to ensure sufficient formability of a resin that contains the hydrogenated cycloolefin ring-opened polymer.

Moreover, the molecular weight distribution (Mw/Mn) of the hydrogenated cycloolefin ring-opened polymer is not specifically limited but is preferably not less than 1 and not more than 5, and more preferably not less than 1 and not more than 4. When the molecular weight distribution of the hydrogenated cycloolefin ring-opened polymer is within any of the ranges set forth above, a barrel having sufficient mechanical strength can be obtained.

<<Copolymer of Cycloolefin and Chain Olefin>>

The copolymer of a cycloolefin and a chain olefin (hereinafter, also referred to simply as a "copolymer") is a polymer that is obtained through copolymerization of a cycloolefin as a monomer and a chain olefin as a monomer.

[Cycloolefin]

Any of the same cycloolefins as previously described in the "Hydrogenated cycloolefin ring-opened polymer" section can be used as the cycloolefin serving as a monomer used in production of the copolymer. One cycloolefin may be used individually, or two or more cycloolefins may be used in combination. Of these cycloolefins, bicyclo[2.2.1]hept-2-ene (common name: norbornene) derivatives and thereof, tetracyclo[4.4.0.1$^{2,5}$0.1$^{7,10}$]dodec-3-ene (common name: tetracyclododecene) and derivatives thereof are preferable, and bicyclo[2.2.1]hept-2-ene is more preferable.

[Chain Olefin]

A compound that has a chain structure formed of carbon atoms and includes a polymerizable carbon-carbon double bond in the chain structure can be used as the chain olefin serving as a monomer in production of the copolymer. Note that the term "chain olefin" as used in the present disclosure is not inclusive of compounds that are cycloolefins.

The chain olefin may, for example, be an α-olefin such as ethylene, propylene, 1-butene, 1-pentene, or 1-hexene; an aromatic ring vinyl compound such as styrene or α-methylstyrene; or a non-conjugated diene such s 1,4-hexadiene, 4-methyl-1,4-hexadiene, 5-methyl-1,4-hexadiene, or 1,7-octadiene.

One chain olefin may be used individually, or two or more chain olefins may be used in combination. Of these examples, α-olefins are preferable, α-olefins having a carbon number of not less than 1 and not more than 20 are more preferable, and ethylene is even more preferable as the chain olefin.

[Copolymer]

No specific limitations are placed on the method by which the copolymer is produced. For example, a known method in which the cycloolefin and the chain olefin described above are addition polymerized using a polymerization catalyst can be adopted. This method may, for example, be a method described in JP2016-155327A.

Although no specific limitations are placed on the ratio of amounts of the cycloolefin and the chain olefin used in production of the copolymer, the amount of the cycloolefin per 100 mass % of the total amount of the cycloolefin and the chain olefin used in production of the copolymer is preferably 30 mass % or more, more preferably 50 mass % or more, and even more preferably 70 mass % or more, and is preferably 99 mass % or less, more preferably 97 mass % or less, and even more preferably 95 mass % or less.

Note that the copolymer of the cycloolefin and the chain olefin may be a block copolymer or may be a random copolymer.

The weight-average molecular weight (Mw) of the copolymer of the cycloolefin and the chain olefin is not specifically limited but is preferably 20,000 or more, and more preferably 25,000 or more, and is preferably 100,000 or less, and more preferably 50,000 or less. When the weight-average molecular weight of the copolymer is 20,000 or more, it is possible to ensure sufficient strength of a barrel obtained through shaping of a resin that contains the copolymer. On the other hand, when the weight-average molecular weight of the copolymer is 100,000 or less, it is possible to ensure sufficient formability of a resin that contains the copolymer.

Moreover, the molecular weight distribution (Mw/Mn) of the copolymer is not specifically limited but is preferably not less than 1 and not more than 5, and more preferably not less than 1 and not more than 4. When the molecular weight distribution of the copolymer is within any of the ranges set forth above, a barrel having sufficient mechanical strength can be obtained.

<<Preferred Polymer>>

The resin used to form the barrel contains either or both of a hydrogenated cycloolefin ring-opened polymer and a copolymer of a cycloolefin and a chain olefin as previously described, but preferably contains at least a hydrogenated cycloolefin ring-opened polymer. By using a barrel that is obtained through shaping of a resin containing at least a hydrogenated cycloolefin ring-opened polymer, it is possible to further inhibit protein aggregation in the protein solution formulation during long-term storage of the pre-filled syringe.

<<Other Components>>

Examples of other components that can be contained in the resin used to form the barrel include polymer components (thermoplastic elastomers, etc.) other than the polymers described above and known additives. Examples of known additives that can be used include antioxidants, ultraviolet absorbers, light stabilizers, near-infrared absorbers, plasticizers, antistatic agents, acid scavengers, and the like described in JP2016-155327A, for example.

The content of these other components in the resin can be set as appropriate depending on the objective of addition of the component. For example, in a case in which a thermoplastic elastomer is used, the used amount of the thermoplastic elastomer is preferably not less than 0.05 parts by mass and not more than 0.5 parts by mass when the total amount of the hydrogenated cycloolefin ring-opened polymer and the copolymer of a cycloolefin and a chain olefin is taken to be 100 parts by mass (i.e., when the amount of either of these polymers is taken to be 100 parts by mass in a case in which that polymer is used individually).

No specific limitations are placed on the method of mixing when obtaining the resin containing the above-described polymer(s) and other optional components. For example, mixing can be performed using a known melt-kneading machine such as a single-screw extruder, a twin-screw extruder, a Banbury mixer, a kneader, or a Feeder Ruder.

After mixing, the resin can be pelletized in accordance with a standard method by extruding the resin with a rod form and cutting the extruded resin to an appropriate length using a strand cutter.

<<Production Method of Barrel>>

No specific limitations are placed on the method by which the resin containing the components set forth above is shaped to obtain the barrel. For example, a barrel including a nozzle at a tip thereof can be shaped by a method described in the "Method of producing pre-filled syringe" section further below.

<<Water Contact Angle>>

The barrel obtained as set forth above preferably includes a formulation contacting region having a water contact angle of 90° or more at an inner wall surface thereof. When the water contact angle of a formulation contacting region is 90° or more, protein aggregation in the protein solution formulation can be further inhibited during long-term storage of a pre-filled syringe that includes the barrel. From a viewpoint of even further inhibiting protein aggregation in the protein solution formulation, the water contact angle of the formulation contacting region is more preferably 91° or more, even more preferably 92° or more, and particularly preferably 93° or more. The upper limit for the water contact angle of the formulation contacting region is not specifically limited but is normally 110° or less.

Note that the water contact angle of the formulation contacting region can be adjusted by altering the types of polymers and additives contained in the resin used to form the barrel and the method by which the barrel is produced. For example, the value of the water contact angle of the formulation contacting region can be improved by using a hydrophobic polymer or additive (polymer or additive that does not include a hydrophilic group, for example). Moreover, the value of the water contact angle of the formulation contacting region can be improved by performing pre-drying described in the "Method of producing pre-filled syringe" section further below in advance of shaping the resin, for example.

<<Sealing Member>>

The sealing member included in the presently disclosed pre-filled syringe is not specifically limited so long as it can prevent leakage of the protein solution formulation from the tip of the barrel and can be a known sealing member such as a cap or an injection needle. In the pre-filled syringe 1 illustrated in FIG. 1, for example, a cap that fits with the nozzle 12 of the barrel 10 is included as the sealing member 20.

No specific limitations are placed on the material from which the sealing member is formed. In a case in which the sealing member is a cap, for example, the sealing member can be formed using a known resin described in Japanese Utility Model Registration No. 3150720.

<<Gasket>>

The gasket included in the presently disclosed pre-filled syringe is not specifically limited so long as it can hermetically seal the protein solution formulation inside the barrel. It is preferable that at least a peripheral part of the gasket is formed of an elastic material. For example, the gasket may have a configuration including a core (not illustrated) that is formed of a rigid material and an elastic material disposed such as to cover the periphery of the core.

No specific limitations are placed on the material from which the gasket is formed. For example, elastic rubbers and synthetic resins described in JP5444835B2 can be used.

<<Plunger>>

The plunger included in the presently disclosed pre-filled syringe is a member that is linked to the gasket described above and that can move the gasket in a longitudinal direction inside the previously described barrel. In the pre-filled syringe 1 illustrated in FIG. 1, for example, the plunger 40 includes a thumb pad 41 at the opposite end thereof to the gasket 30, and a movement operation of the plunger 40 is performed by pressing the thumb pad 41 using a thumb or the like. As a result of the gasket 30 moving in accompaniment to a movement operation of the plunger 40, the protein solution formulation 50 can be expelled externally from the nozzle 12 of the barrel 10.

No specific limitations are placed on the material from which the plunger is formed. For example, a resin described in JP5444835B2 can be used.

(Method of Producing Pre-Filled Syringe)

The presently disclosed pre-filled syringe set forth above can suitably be produced by the presently disclosed method of producing a pre-filled syringe, for example.

The presently disclosed method of producing a pre-filled syringe is a method of producing a pre-filled syringe having a protein solution formulation filled into an inner part of a syringe that includes: a barrel including a nozzle at a tip thereof; a sealing member sealing the nozzle; a gasket slidably housed inside the barrel; and a plunger linked to the gasket and performing a movement operation of the gasket in a longitudinal direction of the barrel. The presently disclosed method of producing a pre-filled syringe includes at least a step (filling step) of loading the protein solution formulation into the barrel to obtain a pre-filled syringe that is filled with the protein solution formulation. Features of the presently disclosed method of producing a pre-filled syringe are that the barrel is a shaped product of a resin containing a hydrogenated cycloolefin ring-opened polymer and/or a copolymer of a cycloolefin and a chain olefin, and that a protein solution formulation having a non-ionic surfactant concentration of more than 0 mg/mL and less than 0.05 mg/mL is filled into a space defined by the sealing member, the gasket, and a region (formulation contacting region) that is part of an inner wall surface of the barrel.

A pre-filled syringe that is obtained by filling a protein solution formulation having a non-ionic surfactant concentration of more than 0 mg/mL and less than 0.05 mg/mL into a barrel formed of a resin containing a hydrogenated cycloolefin ring-opened polymer and/or a copolymer of a cycloolefin and a chain olefin through the filling step set forth above can inhibit protein aggregation in the protein solution formulation and can limit the produced amount of a decomposition product of the non-ionic surfactant to a low level, even in a situation in which the pre-filled syringe is stored for a long time, for the same reason as previously described in the "Pre-filled syringe" section.

Note that the "nozzle", "barrel", "hydrogenated cycloolefin ring-opened polymer", "copolymer of a cycloolefin and a chain olefin", "resin", "sealing member", "gasket", "plunger", "protein solution formulation", and so forth in the following description are the same as previously described in the "Pre-filled syringe" section. In other words, specific examples, preferable examples, and so forth of the "nozzle", "barrel", "hydrogenated cycloolefin ring-opened polymer", "copolymer of a cycloolefin and a chain olefin", "resin", "sealing member", "gasket", "plunger", and "protein solution formulation" in the presently disclosed method of producing a pre-filled syringe are the same as the specific examples, preferable examples, and so forth of the "nozzle", "barrel", "hydrogenated cycloolefin ring-opened polymer", "copolymer of a cycloolefin and a chain olefin", "resin", "sealing member", "gasket", "plunger", and "protein solution formulation" in the presently disclosed pre-filled syringe set forth above, and thus description thereof is omitted in this section.

<Filling Step>

The method by which a protein solution formulation is loaded into the barrel such that a space defined by the sealing member, the gasket, and the formulation contacting region of the barrel inner wall surface is filled with a protein solution formulation having a non-ionic surfactant concentration within a specific range is not specifically limited and can be a known method such as described in JP2012-29918A, for example. The filling step is preferably performed under sterilization.

<Other Steps>

The presently disclosed method of producing a pre-filled syringe can optionally include steps other than the filling step set forth above (i.e., other steps).

In the presently disclosed method of producing a pre-filled syringe, it is preferable that a series of operations that enable simple production of a barrel having a preferred inner wall surface property are performed before the filling step set forth above. Specifically, the presently disclosed method of producing a pre-filled syringe preferably includes, in advance of the filling step set forth above, a step (pre-drying step) of pre-drying the resin that serves as a shaping material, and a step (shaping step) of shaping the resin after the pre-drying to form the barrel.

<<Pre-Drying Step>>

By drying the resin that is used to form the barrel in advance of shaping the resin, the water contact angle of the surface of the barrel (particularly a formulation contacting region of the inner wall surface) can be improved, and protein aggregation in the protein solution formulation can be further inhibited. Note that although it is not clear why the water contact angle of the surface of the barrel that is obtained after shaping can be improved by drying the resin before shaping, it is presumed that the drying can reduce the oxygen concentration in the resin, and can thereby inhibit oxidation and hydrophilizing of the barrel surface due to heat during shaping.

Note that no specific limitations are placed on the shape of the resin during the pre-drying. The resin can have any shape such as a sheet shape or a pellet shape, but preferably has a pellet shape from a viewpoint of drying efficiency and ease of shaping.

The oxygen concentration in the resin after the pre-drying is preferably 10 mass ppm or less, more preferably 5 mass ppm or less, and even more preferably 4 mass ppm or less. When the oxygen concentration in the resin after the pre-drying is 10 mass ppm or less, the value of the water contact angle of the formulation contacting region of the barrel formed from the resin can be improved, and thus protein aggregation in the protein solution formulation can be further inhibited in a pre-filled syringe that includes the barrel.

The pre-drying is preferably performed in an inert gas atmosphere. By performing the pre-drying in an inert gas atmosphere, oxygen can be efficiently removed from the resin and oxidation of the resin due to external oxygen can be prevented. As a result, protein aggregation in the protein solution formulation can be further inhibited in a pre-filled syringe that includes the obtained barrel. Examples of inert gases that can be used include helium, argon, nitrogen, neon, krypton, and mixtures thereof.

The drying temperature (atmosphere temperature) of the pre-drying is preferably 80° C. or higher, more preferably 90° C. or higher, and even more preferably 100° C. or higher, and is preferably 120° C. or lower, and more preferably 110° C. or lower. When the drying temperature of the pre-drying is 80° C. or higher, oxygen can be efficiently removed from the resin, and, as a result, protein aggregation in the protein solution formulation can be further inhibited in a pre-filled syringe that includes the obtained barrel. On the other hand, when the drying temperature of the pre-drying is 120° C. or lower, curing of the resin prior to shaping can be prevented.

The drying time of the pre-drying is preferably 1 hour or more, more preferably 2 hours or more, and even more preferably 4 hours or more, and is preferably 24 hours or less, and more preferably 12 hours or less. When the drying time of the pre-drying is 1 hour or more, oxygen can be efficiently removed from the resin, and, as a result, protein aggregation in the protein solution formulation can be further inhibited in a pre-filled syringe that includes the obtained barrel. On the other hand, when the drying time of the pre-drying is 24 hours or less, oxidative degradation of the resin prior to shaping can be prevented.

<<Shaping Step>>

The method by which the resin after the pre-drying set forth above is shaped to obtain a barrel of a desired shape is not specifically limited and can be a known shaping method such as injection molding, injection blow molding (cold parison method), or thermoforming. Of these methods, injection molding is preferable in terms that a target barrel can be efficiently produced.

In production of a barrel by injection molding, the resin is typically loaded into a hopper of an injection molding machine, is plasticized through heating inside a cylinder, and then molten resin (plasticized resin) is injected into a mold from an injection port. The molten resin cools and hardens inside the mold to thereby form the barrel.

The cylinder temperature during plasticizing of the resin is preferably not lower than 200° C. and not higher than 400° C., more preferably not lower than 200° C. and not higher than 350° C., and even more preferably not lower than 250° C. and not higher than 310° C. When the cylinder temperature is 200° C. or higher, fluidity of molten resin is ensured, and sink marks and distortion do not arise in the barrel. On the other hand, when the cylinder temperature is 400° C. or lower, yellowing of the barrel and the occurrence of silver streaks due to thermal decomposition of the shaping material can be inhibited.

The injection rate during injection of the molten resin into the mold from the cylinder is preferably not less than 1 cm$^3$/s and not more than 1,000 cm$^3$/s. It is easier to obtain a barrel having excellent external shape when the injection rate is within the range set forth above. The injection pressure when the molten resin is injected into the mold from the cylinder is not specifically limited and can be set as appropriate in consideration of the type of mold, the fluidity of the molten resin, and so forth, but is normally not lower than 30 MPa and not higher than 250 MPa.

The mold temperature is normally a lower temperature than the glass-transition temperature (Tg) of the polymer (hydrogenated cycloolefin ring-opened polymer and/or copolymer of cycloolefin and chain olefin) in the resin, preferably a temperature that is 5° C. to 50° C. lower than Tg, and more preferably a temperature that is 5° C. to 30° C. lower than Tg. It is easier to obtain a barrel having little distortion when the mold temperature is within the range set forth above.

Note that the presently disclosed method of producing a pre-filled syringe can include a step of sterilizing the barrel, the gasket, and the sealing member before the filling step, for example, as another step besides the pre-drying step and the shaping step set forth above.

EXAMPLES

The following provides a more specific description of the present disclosure through examples. However, the present disclosure is not limited to these examples. In the following description, "%" and "parts" used in expressing quantities are by mass, unless otherwise specified.

In the examples and comparative examples, the following methods were used to measure and evaluate the molecular weight, etc. (weight-average molecular weight, number-average molecular weight, and molecular weight distribution) of a polymer, the percentage hydrogenation in hydrogenation of a polymer, the glass-transition temperature of a polymer, the oxygen concentration in a resin, the water contact angle of a formulation contacting region at an inner wall surface of a barrel, the non-ionic surfactant concentration in a protein solution formulation after long-term storage of a pre-filled syringe (post-storage concentration), the occurrence of production of a decomposition product of a non-ionic surfactant in a protein solution formulation after long-term storage of a pre-filled syringe, and the inhibition of protein aggregation in a protein solution formulation after long-term storage of a pre-filled syringe.

<Molecular Weight, Etc.>

The weight-average molecular weight (Mw) and the number-average molecular weight (Mn) of a polymer were measured as standard polyisoprene-equivalent values by gel permeation chromatography (GPC) with cyclohexane as a solvent. The molecular weight distribution (Mw/Mn) was calculated from the obtained values of Mw and Mn. An HLC-8320GPC (produced by Tosoh Corporation) was used as a measurement apparatus. The standard polyisoprene was standard polyisoprene (monodisperse) produced by Tosoh Corporation, and a total of 10 points corresponding to weight-average molecular weights (Mw) of 602, 1,390, 3,920, 8,050, 13,800, 22,700, 58,800, 71,300, 109,000, and 280,000 were used. Measurement was performed with a TSKgel G5000HXL, a TSKgel G4000HXL, and a TSKgel G2000HXL (each produced by Tosoh Corporation) connected in series as a column and under conditions of a flow rate of 1.0 mL/min, a sample injection volume of 100 μmL, and a column temperature of 40° C.

<Percentage Hydrogenation>

The percentage hydrogenation in a hydrogenation reaction was calculated through 1H-NMR measurement with deuterated chloroform as a solvent.

<Glass-Transition Temperature (Tg)>

Glass-transition temperature measurement was performed based on JIS K 6911 using a differential scanning calorimeter (DSC6220 produced by SII NanoTechnology Inc.).

<Oxygen Concentration in Resin>

A thermal desorption analyzer (produced by ESCO, Ltd.; product name: WA1000S/W) was used to heat resin pellets at 130° C. for 60 minutes and to measure the amount of desorbed oxygen during this heating in order to calculate the oxygen concentration in the resin.

<Water Contact Angle>

A barrel was cut by diagonal pliers to cut out a formulation contacting region of the barrel. A goniometer (produced by Kyowa Interface Science Co., Ltd.; product name: Drop Master 300) was used to measure the static contact angle by a curve fitting method for 10 arbitrarily selected locations in the formulation contacting region, and an average value of the measured values was taken to be the water contact angle of the formulation contacting region.

<Post-Storage Concentration of Non-Ionic Surfactant>

A pre-filled syringe was left at rest in the dark at 4° C. for 1 week. After the pre-filled syringe had been left at rest for 1 week, the protein solution formulation inside the pre-filled syringe was pushed out from the nozzle by applying pressure to the plunger linked to the gasket, and the protein solution formulation was collected.

The non-ionic surfactant concentration in the protein solution formulation after long-term storage (post-storage concentration) was calculated by the following formula.

Post-storage concentration(mg/mL)=Non-ionic surfactant concentration before long-term storage (mg/mL; initial concentration)×(A1/A0)

Note that A0 and A1 in the preceding formula are the area intensities of peaks attributed to a non-ionic surfactant that were obtained from data acquired through high-performance liquid chromatography (HPLC) analysis of the protein solution formulation before long-term storage and after long-term storage, respectively. The conditions under which HPLC was performed were as follows.

Apparatus: HP-1100 (product name; produced by Agilent Technologies, Inc.)
Column: ZORBAX® (ZORBAX is a registered trademark in Japan, other countries, or both) Eclipse Plus C18HT (product name; 2.1 mm i.d.×150 mm, 1.8 μm; produced by Agilent Technologies, Inc.)
Solvent: Acetonitrile/water=70/30
Injection volume: 16 μL
Flow rate: 0.4 mL/min
Detection method: UV 198 nm <Occurrence of Production of Decomposition Product of Non-Ionic Surfactant>

A pre-filled syringe was left at rest in the dark at 4° C. for 1 week. After the pre-filled syringe had been left at rest for 1 week, the protein solution formulation inside the pre-filled syringe was pushed out from the nozzle by applying pressure to the plunger linked to the gasket, and the protein solution formulation was collected.

HPLC analysis of the protein solution formulation after long-term storage was performed under the same conditions as in "Post-storage concentration of non-ionic surfactant", and the presence or absence of a peak attributed to a decomposition product was checked. Note that a judgment of "Yes" for production of a decomposition product after storage was made in a case in which such a peak was observed, whereas a judgment of "No" for production of a decomposition product after storage (i.e., that the produced amount was below the limit of detection) was made in a case in which such a peak was not observed.

<Inhibition of Protein Aggregation>

A pre-filled syringe was left at rest in the dark at 4° C. for 1 week. After the pre-filled syringe had been left at rest for 1 week, the protein solution formulation inside the pre-filled syringe was pushed out from the nozzle by applying pressure to the plunger linked to the gasket, and the protein solution formulation was collected. The number of aggregates having a particle diameter of 1 μm or more that were contained in the collected protein solution formulation was visually counted using a FlowCam 8100 (Fluid Imaging Technologies, Scarborough, ME). Note that the sample volume was 0.15 mL, and analysis was performed at a flow rate of 0.05 mL/min. Data analysis was performed using Visual Spreadsheet Software (Fluid Imaging Technologies). The same operations were performed a total of four times. The number of aggregates per unit volume (aggregates/mL) was calculated for each repetition of the operations, and an average value of the calculated values was taken to be the post-storage aggregate concentration (aggregates/mL). A smaller value for the post-storage aggregate concentration can be said to signify that protein aggregation in the protein solution formulation during long-term storage of the pre-filled syringe is inhibited.

Example 1

Preparation of Protein Solution Formulation

Purified Humira (adalimumab) was adjusted to a concentration of 0.1 mg/mL using phosphate buffered saline (pH: 7.0; NaCl: 200 mM; phosphoric acid: 100 mM), and polysorbate 80 was added as a non-ionic surfactant such as to have a concentration of 0.01 mg/mL to obtain a protein solution formulation.

<Production of Barrel>

<<Production of Hydrogenated Cycloolefin Ring-Opened Polymer (Hydrogenated Product A)>>

In a nitrogen atmosphere, 0.82 parts of 1-hexene, 0.15 parts of dibutyl ether, and 0.30 parts of triisobutylaluminum were added to 500 parts of dehydrated cyclohexane in a reactor at room temperature and were mixed therewith. Thereafter, the mixture was held at 45° C. while 76 parts of tricyclo[4.3.0.1$^{2,5}$]deca-3,7-diene (common name: dicyclopentadiene; abbreviated hereinafter, as "DCP"), 70 parts of 8-methyl-tetracyclo[4.4.0.1$^{2,5}$0.1$^{7,10}$]dodec-3-ene, 54 parts of tetracyclo[7.4.0.0$^{2,7}$0.1$^{10,13}$]trideca-2,4,6,11-tetraene (hereinafter, abbreviated as "MTF"), and 80 parts of tungsten hexachloride (0.7% toluene solution) were continuously added over 2 hours, concurrently to one another, and polymerization was carried out. Next, 1.06 parts of butyl glycidyl ether and 0.52 parts of isopropyl alcohol were added to the polymerization solution to deactivate the polymerization catalyst and stop the polymerization reaction. When the resultant reaction solution containing a ring-opened polymer was analyzed by gas chromatography, the polymerization conversion rate of monomers was 99.5%.

Next, 270 parts of cyclohexane was added to 100 parts of the obtained reaction solution containing the ring-opened polymer, 5 parts of diatomite-supported nickel catalyst (nickel support rate: 58 weight %; pore volume: 0.25 mL/g; specific surface area: 180 m$^2$/g) was further added as a hydrogenation catalyst, the pressure was raised to 5 MPa with hydrogen, heating was performed to a temperature of 200° C. under stirring, and then a reaction was carried out for 8 hours to obtain a reaction solution containing a hydrogenated DCP/8-methyl-tetracyclo[4.4.0.1$^{2,5}$0.1$^{7,10}$]dodec-3-ene/MTF ring-opened copolymer. The hydrogenation catalyst was removed by filtration, and then cyclohexane serving as a solvent and other volatile components were removed from the solution at a temperature of 270° C. and a pressure of 1 kPa or lower using a cylindrical evaporator (produced by Hitachi, Ltd.). Next, the hydrogenated product was extruded in a strand form from an extruder while in a molten state, was cooled, and was subsequently pelletized to obtain pellets. The hydrogenated cycloolefin ring-opened polymer (hydrogenated product A) that had been pelletized had an Mw of 33,000, a molecular weight distribution (Mw/Mn) of 2.4, a percentage hydrogenation of 99.8%, and a Tg of 136° C.

<<Production of Resin Pellets Containing Hydrogenated Product A>>

After mixing 100 parts of the hydrogenated product A obtained as described above and 0.017 parts of pentaerythritol tetrakis[3-(3,5-di-t-butyl-4-hydroxyphenyl) propionate] as an antioxidant using a blender, a twin-screw kneader for which hopper purging with nitrogen had been performed was used to knead and extrude the mixture at a cylinder temperature of 275° C. to obtain resin pellets.

<<Pre-Drying and Shaping>>

A hot-air dryer was used to dry (pre-dry) the resin pellets obtained as described above in a nitrogen atmosphere under conditions of an atmosphere temperature of 100° C. and a drying time of 6 hours. The oxygen concentration of the resin after this pre-drying was measured. The result is shown in Table 1.

The pre-dried resin was injection molded under the following conditions using an injection molding machine (produced by FANUC Corporation; product name: ROBOSHOT αS-50iA) in which a mold for a syringe molded product (syringe size: in accordance with 1 mL-Long size of ISO Standard 11040-6) was installed in order to produce a barrel of a syringe.

Cylinder temperature: 305° C.
Mold temperature: 120° C.
Injection rate: 180 mm/s
Cooling time: 30 s
Injection pressure (holding pressure): 100 MPa
Holding pressure time: 5 s The water contact angle of a formulation contacting region of the obtained barrel was measured. The result is shown in Table 1.

<Production of Pre-Filled Syringe>

The barrel and the protein solution formulation described above were used to produce a pre-filled syringe having the configuration illustrated in FIG. 1 by the following procedure. Note that production of the pre-filled syringe was performed in a sterilized environment.

A cap made from isoprene rubber was attached to a tip of the obtained barrel, and 1.0 mL of the protein solution formulation was filled into the barrel. Next, a plunger having a gasket made from butyl rubber attached thereto was inserted from the base end of the barrel to hermetically seal the barrel and obtain a pre-filled syringe that was filled with the protein solution formulation. The obtained pre-filled syringe was used to evaluate the post-storage concentration of the non-ionic surfactant, occurrence of production of a decomposition product of the non-ionic surfactant, and inhibition of protein aggregation. The results are shown in Table 1.

Example 2

A protein solution formulation was prepared, a barrel and a pre-filled syringe were produced, and various evaluations were performed in the same way as in Example 1 with the exception that polysorbate 80 was added as a non-ionic surfactant such as to have a concentration of 0.04 mg/mL in preparation of the protein solution formulation. The results are shown in Table 1.

Example 3

A protein solution formulation was prepared, a barrel and a pre-filled syringe were produced, and various evaluations were performed in the same way as in Example 1 with the exception that a copolymer of a cycloolefin and a chain olefin (copolymer B) that was produced as described below was used instead of the hydrogenated cycloolefin ring-opened polymer (hydrogenated product A) in production of the barrel. The results are shown in Table 1.

<<Production of Copolymer of Cycloolefin and Chain Olefin (Copolymer B)>>

In a stream of nitrogen at normal temperature, norbornene (120 kg) was added into a reactor that had been charged with 258 L of cyclohexane and was stirred for 5 minutes. In addition, triisobutylaluminum was added such that the concentration thereof in the system was 1.0 mL/L. Next, ethylene was circulated at normal pressure while performing stirring in order to convert the system to an ethylene atmosphere. An autoclave internal temperature of 70° C. was maintained while raising the internal pressure to a gauge pressure of 6 kg/cm$^2$ with ethylene. After 10 minutes of stirring, 0.4 L of a pre-prepared toluene solution containing isopropylidene (cyclopentadienyl) (indenyl) zirconium dichloride and methylalumoxane was added to initiate a copolymerization reaction of ethylene and norbornene. The catalyst concentration relative to the entire system at this was point 0.018 mmol/L of isopropylidene (cyclopentadienyl) (indenyl) zirconium dichloride and 8.0 mmol/L of methylalumoxane. Ethylene was continuously supplied into the system during the copolymerization reaction in order to maintain the temperature at 70° C. and the internal pressure at a gauge pressure of 6 kg/cm$^2$. After 60 minutes, isopropyl alcohol was added to stop the copolymerization reaction. Depressurization was performed, and then a polymer solution was removed and was brought into contact with an aqueous solution of 5 L of concentrated hydrochloric acid added to 1 m$^3$ of water under vigorous stirring in a ratio of 1:1 to cause catalyst residue to move into the aqueous phase. This contacted liquid mixture was left to settle, the aqueous phase was separated and removed, and washing with water was performed twice to purify and separate a polymerization liquid phase.

The polymerization liquid phase that had been purified and separated was then brought into contact with 3 equivalents of acetone under vigorous stirring to cause precipitation of a copolymer. Thereafter, solid (copolymer) was collected by filtration and was thoroughly washed with acetone. The solid was added into acetone in a concentration of 40 kg/m$^3$ and an extraction operation was subsequently performed under conditions of 2 hours at 60° C. in order to extract unreacted monomer. After this extraction, solid was collected by filtration and was dried under circulation of nitrogen at 130° C. and 350 mmHg for 12 hours to yield an ethylene-norbornene copolymer (copolymer B).

The ethylene-norbornene copolymer (copolymer B) was pelletized in the same way as the hydrogenated product A of Production Example 1. The pelletized ethylene-norbornene copolymer (copolymer B) had a weight-average molecular weight (Mw) of 96,000, a molecular weight distribution (Mw/Mn) of 2.4, and a Tg of 138° C.

Example 4

A protein solution formulation was prepared, a barrel and a pre-filled syringe were produced, and various evaluations were performed in the same way as in Example 3 with the exception that polysorbate 80 was added as a non-ionic surfactant such as to have a concentration of 0.04 mg/mL in preparation of the protein solution formulation. The results are shown in Table 1.

Example 5

A protein solution formulation was prepared, a barrel and a pre-filled syringe were produced, and various evaluations were performed in the same way as in Example 1 with the exception that pre-drying was not performed in production of the barrel. The results are shown in Table 1.

Example 6

A protein solution formulation was prepared, a barrel and a pre-filled syringe were produced, and various evaluations were performed in the same way as in Example 5 with the exception that polysorbate 80 was added as a non-ionic surfactant such as to have a concentration of 0.04 mg/mL in preparation of the protein solution formulation. The results are shown in Table 1.

Example 7

A protein solution formulation was prepared, a barrel and a pre-filled syringe were produced, and various evaluations were performed in the same way as in Example 3 with the exception that pre-drying was not performed in production of the barrel. The results are shown in Table 1.

Example 8

A protein solution formulation was prepared, a barrel and a pre-filled syringe were produced, and various evaluations were performed in the same way as in Example 7 with the exception that polysorbate 80 was added as a non-ionic surfactant such as to have a concentration of 0.04 mg/mL in preparation of the protein solution formulation. The results are shown in Table 1.

Example 9

A barrel and a pre-filled syringe were produced, and various evaluations were performed in the same way as in Example 1 with the exception that a protein solution formulation prepared as described below was used. The results are shown in Table 1.

Preparation of Protein Solution Formulation

Purified Remicade (infliximab) was adjusted to a concentration of 0.1 mg/mL using phosphate buffered saline (pH: 7.0; NaCl: 200 mM; phosphoric acid: 100 mM), and polysorbate 80 was added as a non-ionic surfactant such as to have a concentration of 0.01 mg/mL to obtain a protein solution formulation.

Example 10

A protein solution formulation was prepared, a barrel and a pre-filled syringe were produced, and various evaluations were performed in the same way as in Example 9 with the exception that polysorbate 80 was added as a non-ionic surfactant such as to have a concentration of 0.04 mg/mL in preparation of the protein solution formulation. The results are shown in Table 1.

Example 11

A protein solution formulation was prepared, a barrel and a pre-filled syringe were produced, and various evaluations were performed in the same way as in Example 9 with the exception that a copolymer of a cycloolefin and a chain olefin (copolymer B) that was produced in the same way as in Example 3 was used instead of the hydrogenated cycloolefin ring-opened polymer (hydrogenated product A) in production of the barrel. The results are shown in Table 2.

Example 12

A protein solution formulation was prepared, a barrel and a pre-filled syringe were produced, and various evaluations were performed in the same way as in Example 11 with the exception that polysorbate 80 was added as a non-ionic surfactant such as to have a concentration of 0.04 mg/mL in preparation of the protein solution formulation. The results are shown in Table 2.

Example 13

A protein solution formulation was prepared, a barrel and a pre-filled syringe were produced, and various evaluations were performed in the same way as in Example 11 with the exception that pre-drying was not performed in production of the barrel. The results are shown in Table 2.

Example 14

A protein solution formulation was prepared, a barrel and a pre-filled syringe were produced, and various evaluations were performed in the same way as in Example 13 with the exception that polysorbate 80 was added as a non-ionic surfactant such as to have a concentration of 0.04 mg/mL in preparation of the protein solution formulation. The results are shown in Table 2.

Example 15

A protein solution formulation was prepared, a barrel and a pre-filled syringe were produced, and various evaluations were performed in the same way as in Example 11 with the exception that pre-drying was not performed in production of the barrel. The results are shown in Table 2.

Example 16

A protein solution formulation was prepared, a barrel and a pre-filled syringe were produced, and various evaluations were performed in the same way as in Example 15 with the exception that polysorbate 80 was added as a non-ionic surfactant such as to have a concentration of 0.04 mg/mL in preparation of the protein solution formulation. The results are shown in Table 2.

Example 17

A barrel and a pre-filled syringe were produced, and various evaluations were performed in the same way as in Example 1 with the exception that a protein solution formulation prepared as described below was used. The results are shown in Table 2.

Preparation of Protein Solution Formulation

Purified Humira (adalimumab) was adjusted to a concentration of 0.1 mg/mL using phosphate buffer solution (pH: 7.0; NaCl: 0 mM; phosphoric acid: 100 mM), and polysorbate 80 was added as a non-ionic surfactant such as to have a concentration of 0.01 mg/mL to obtain a protein solution formulation.

Example 18

A barrel and a pre-filled syringe were produced, and various evaluations were performed in the same way as in Example 1 with the exception that a protein solution formulation prepared as described below was used. The results are shown in Table 2.

Preparation of Protein Solution Formulation

Purified Humira (adalimumab) was adjusted to a concentration of 0.1 mg/mL using phosphate buffer solution (pH: 7.0; NaCl: 20 mM; phosphoric acid: 100 mM), and polysorbate 80 was added as a non-ionic surfactant such as to have a concentration of 0.01 mg/mL to obtain a protein solution formulation.

Example 19

A barrel and a pre-filled syringe were produced, and various evaluations were performed in the same way as in Example 1 with the exception that a protein solution formulation prepared as described below was used. The results are shown in Table 2.

Preparation of Protein Solution Formulation

Purified Humira (adalimumab) was adjusted to a concentration of 0.1 mg/mL using a solution produced by adding NaCl to acetate buffer solution (pH: 4.0; acetic acid: 100 mM) such as to have a concentration of 200 mM (NaCl concentration), and polysorbate 80 was added as a non-ionic surfactant such as to have a concentration of 0.01 mg/mL to obtain a protein solution formulation.

Example 20

A barrel and a pre-filled syringe were produced, and various evaluations were performed in the same way as in Example 1 with the exception that a protein solution formulation prepared as described below was used. The results are shown in Table 2.

Preparation of Protein Solution Formulation

Purified Humira (adalimumab) was adjusted to a concentration of 0.1 mg/mL using a solution produced by adding NaCl to acetate buffer solution (pH: 5.0; acetic acid: 100 mM) such as to have a concentration of 200 mM (NaCl concentration), and polysorbate 80 was added as a non-ionic surfactant such as to have a concentration of 0.01 mg/mL to obtain a protein solution formulation.

Example 21

A barrel and a pre-filled syringe were produced, and various evaluations were performed in the same way as in Example 1 with the exception that a protein solution formulation prepared as described below was used. The results are shown in Table 2.

Preparation of Protein Solution Formulation

Purified Humira (adalimumab) was adjusted to a concentration of 0.1 mg/mL using phosphate buffered saline (pH:

6.0; NaCl: 200 mM; phosphoric acid: 100 mM), and polysorbate 80 was added as a non-ionic surfactant such as to have a concentration of 0.01 mg/mL to obtain a protein solution formulation.

Example 22

A protein solution formulation was prepared, a barrel and a pre-filled syringe were produced, and various evaluations were performed in the same way as in Example 1 with the exception that a hydrogenated cycloolefin ring-opened polymer (hydrogenated product C) that was produced as described below was used instead of the hydrogenated cycloolefin ring-opened polymer (hydrogenated product A) in production of the barrel. The results are shown in Table 2.

<<Production of Hydrogenated Cycloolefin Ring-Opened Polymer (Hydrogenated Product C)>>

In a nitrogen atmosphere, 0.55 parts of 1-hexene, 0.11 parts of dibutyl ether, and 0.22 parts of triisobutylaluminum were added to 500 parts of dehydrated cyclohexane in a reactor at room temperature and were mixed therewith. Thereafter, the mixture was held at 45° C. while 170 parts of tricyclo[4.3.0.1$^{2,5}$]dec-3-ene (hereinafter, abbreviated as "DCPD"), 30 parts of 8-ethyl-tetracyclo[4.4.0.1$^{2,5}$0.1$^{7,10}$] dodec-3-ene (hereinafter, abbreviated as ETCD), and 30 parts of a 0.7% toluene solution of tungsten hexachloride were continuously added over 2 hours and polymerization was carried out. The resultant polymerization reaction liquid was transferred to a pressure-resistant hydrogenation reactor, 10 parts of diatomite-supported nickel catalyst (G-96D produced by Nissan Girdler Catalyst Company; nickel support rate: 58 weight %) and 200 parts of cyclohexane were added, and a reaction was carried out at 150° C. and a hydrogen pressure of 45 kgf/cm$^2$ for 8 hours. Diatomite as a filter aid was laid on a stainless steel screen of a filtration apparatus, and then the hydrogenation reaction liquid was filtered to remove the catalyst. A hydrogenated product was caused to precipitate by pouring the filtered reaction solution into 3,000 parts of isopropyl alcohol under stirring and was then separated by filtration and collected. The obtained hydrogenated product was washed with 500 parts of acetone and was subsequently dried in a vacuum dryer set to 1 torr or lower and 100° C. for 48 hours to yield 190 parts of a hydrogenated cycloolefin ring-opened polymer (hydrogenated product C).

The hydrogenated cycloolefin ring-opened polymer (hydrogenated product C) was pelletized in the same way as the hydrogenated product A of Production Example 1. The hydrogenated cycloolefin ring-opened polymer (hydrogenated product C) that had been pelletized had an Mw of 40,000, a 25 molecular weight distribution (Mw/Mn) of 3.3, a percentage hydrogenation of 99.8%, a Tg of 102° C., and a copolymerization composition (weight ratio) of DCPD/ETCD=85/15.

Example 23

A protein solution formulation was prepared, a barrel and a pre-filled syringe were produced, and various evaluations were performed in the same way as in Example 22 with the exception that polysorbate 80 was added as a non-ionic surfactant such as to have a concentration of 0.04 mg/mL in preparation of the protein solution formulation. The results are shown in Table 2.

Example 24

A protein solution formulation was prepared, a barrel and a pre-filled syringe were produced, and various evaluations were performed in the same way as in Example 1 with the exception that 0.1 parts of an aromatic vinyl-conjugated diene block copolymer "Tuftec® H1043" (Tuftec is a registered trademark in Japan, other countries, or both; produced by Asahi Kasei Corporation) and 0.1 parts of an aromatic vinyl-conjugated diene block copolymer "Tuftec® H1051" (produced by Asahi Kasei Corporation) were added as stabilizers (thermoplastic elastomers) when obtaining resin pellets. The results are shown in Table 2.

Comparative Example 1

A protein solution formulation was prepared, a barrel and a pre-filled syringe were produced, and various evaluations were performed in the same way as in Example 1 with the exception that polysorbate 80 was added as a non-ionic surfactant such as to have a concentration of 0.50 mg/mL in preparation of the protein solution formulation. The results are shown in Table 3.

Comparative Example 2

A protein solution formulation was prepared, a barrel and a pre-filled syringe were produced, and various evaluations were performed in the same way as in Example 1 with the exception that polysorbate 80 was added as a non-ionic surfactant such as to have a concentration of 1.00 mg/mL in preparation of the protein solution formulation. The results are shown in Table 3.

Comparative Example 3

A protein solution formulation was prepared, a barrel and a pre-filled syringe were produced, and various evaluations were performed in the same way as in Example 3 with the exception that polysorbate 80 was added as a non-ionic surfactant such as to have a concentration of 0.50 mg/mL in preparation of the protein solution formulation. The results are shown in Table 3.

Comparative Example 4

A protein solution formulation was prepared, a barrel and a pre-filled syringe were produced, and various evaluations were performed in the same way as in Example 3 with the exception that polysorbate 80 was added as a non-ionic surfactant such as to have a concentration of 1.00 mg/mL in preparation of the protein solution formulation. The results are shown in Table 3.

Comparative Example 5

A protein solution formulation was prepared, a barrel and a pre-filled syringe were produced, and various evaluations were performed in the same way as in Example 5 with the exception that polysorbate 80 was added as a non-ionic surfactant such as to have a concentration of 0.50 mg/mL in preparation of the protein solution formulation. The results are shown in Table 3.

Comparative Example 6

A protein solution formulation was prepared, a barrel and a pre-filled syringe were produced, and various evaluations were performed in the same way as in Example 5 with the exception that polysorbate 80 was added as a non-ionic surfactant such as to have a concentration of 1.00 mg/mL in preparation of the protein solution formulation. The results are shown in Table 3.

Comparative Example 7

A protein solution formulation was prepared, a barrel and a pre-filled syringe were produced, and various evaluations were performed in the same way as in Example 7 with the exception that polysorbate 80 was added as a non-ionic surfactant such as to have a concentration of 0.50 mg/mL in preparation of the protein solution formulation. The results are shown in Table 3.

Comparative Example 8

A protein solution formulation was prepared, a barrel and a pre-filled syringe were produced, and various evaluations were performed in the same way as in Example 7 with the exception that polysorbate 80 was added as a non-ionic surfactant such as to have a concentration of 1.00 mg/mL in preparation of the protein solution formulation. The results are shown in Table 3.

Comparative Example 9

A protein solution formulation was prepared, a pre-filled syringe was produced, and various evaluations were performed in the same way as in Example 1 with the exception that a barrel made from glass was used as the barrel. The results are shown in Table 3.

Comparative Example 10

A protein solution formulation was prepared, a pre-filled syringe was produced, and various evaluations were performed in the same way as in Example 2 with the exception that a barrel made from glass was used as the barrel. The results are shown in Table 3.

Comparative Example 11

A protein solution formulation was prepared, a pre-filled syringe was produced, and various evaluations were performed in the same way as in Comparative Example 1 with the exception that a barrel made from glass was used as the barrel. The results are shown in Table 3.

Comparative Example 12

A protein solution formulation was prepared, a pre-filled syringe was produced, and various evaluations were performed in the same way as in Comparative Example 2 with the exception that a barrel made from glass was used as the barrel. The results are shown in Table 3.

Comparative Example 13

A protein solution formulation was prepared, a barrel and a pre-filled syringe were produced, and various evaluations were performed in the same way as in Example 9 with the exception that polysorbate 80 was added as a non-ionic surfactant such as to have a concentration of 0.50 mg/mL in preparation of the protein solution formulation. The results are shown in Table 4.

Comparative Example 14

A protein solution formulation was prepared, a barrel and a pre-filled syringe were produced, and various evaluations were performed in the same way as in Example 9 with the exception that polysorbate 80 was added as a non-ionic surfactant such as to have a concentration of 1.00 mg/mL in preparation of the protein solution formulation. The results are shown in Table 4.

Comparative Example 15

A protein solution formulation was prepared, a barrel and a pre-filled syringe were produced, and various evaluations were performed in the same way as in Example 11 with the exception that polysorbate 80 was added as a non-ionic surfactant such as to have a concentration of 0.50 mg/mL in preparation of the protein solution formulation. The results are shown in Table 4.

Comparative Example 16

A protein solution formulation was prepared, a barrel and a pre-filled syringe were produced, and various evaluations were performed in the same way as in Example 11 with the exception that polysorbate 80 was added as a non-ionic surfactant such as to have a concentration of 1.00 mg/mL in preparation of the protein solution formulation. The results are shown in Table 4.

Comparative Example 17

A protein solution formulation was prepared, a barrel and a pre-filled syringe were produced, and various evaluations were performed in the same way as in Example 13 with the exception that polysorbate 80 was added as a non-ionic surfactant such as to have a concentration of 0.50 mg/mL in preparation of the protein solution formulation. The results are shown in Table 4.

Comparative Example 18

A protein solution formulation was prepared, a barrel and a pre-filled syringe were produced, and various evaluations were performed in the same way as in Example 13 with the exception that polysorbate 80 was added as a non-ionic surfactant such as to have a concentration of 1.00 mg/mL in preparation of the protein solution formulation. The results are shown in Table 4.

Comparative Example 19

A protein solution formulation was prepared, a barrel and a pre-filled syringe were produced, and various evaluations were performed in the same way as in Example 15 with the exception that polysorbate 80 was added as a non-ionic surfactant such as to have a concentration of 0.50 mg/mL in preparation of the protein solution formulation. The results are shown in Table 4.

Comparative Example 20

A protein solution formulation was prepared, a barrel and a pre-filled syringe were produced, and various evaluations were performed in the same way as in Example 15 with the exception that polysorbate 80 was added as a non-ionic surfactant such as to have a concentration of 1.00 mg/mL in preparation of the protein solution formulation. The results are shown in Table 4.

Comparative Example 21

A protein solution formulation was prepared, a pre-filled syringe was produced, and various evaluations were performed in the same way as in Example 9 with the exception that a barrel made from glass was used as the barrel. The results are shown in Table 4.

Comparative Example 22

A protein solution formulation was prepared, a pre-filled syringe was produced, and various evaluations were performed in the same way as in Example 10 with the exception that a barrel made from glass was used as the barrel. The results are shown in Table 4.

Comparative Example 23

A protein solution formulation was prepared, a pre-filled syringe was produced, and various evaluations were performed in the same way as in Comparative Example 13 with the exception that a barrel made from glass was used as the barrel. The results are shown in Table 4.

Comparative Example 24

A protein solution formulation was prepared, a pre-filled syringe was produced, and various evaluations were performed in the same way as in Comparative Example 14 with the exception that a barrel made from glass was used as the barrel. The results are shown in Table 4.

TABLE 1

| | | Example 1 | Example 2 | Example 3 | Example 4 | Example 5 |
|---|---|---|---|---|---|---|
| Barrel | Material (polymer) | Hydrogenated product A | Hydrogenated product A | Copolymer B | Copolymer B | Hydrogenated product A |
| | Pre-drying | Yes | Yes | Yes | Yes | No |
| | Oxygen concentration in resin before shaping (after pre-drying) [mass ppm] | 1.5 | 1.5 | 4 | 4 | 21 |
| | Water contact angle of formulation contacting region [°] | 93 | 93 | 94 | 94 | 87 |
| Protein solution formulation | Type of protein | Adalimumab | Adalimumab | Adalimumab | Adalimumab | Adalimumab |
| | pH of used buffer solution [—] | 7 | 7 | 7 | 7 | 7 |
| | NaCl concentration of used buffer solution [mM] | 200 | 200 | 200 | 200 | 200 |
| | Concentration of non-ionic surfactant (initial concentration) [mg/mL] | 0.01 | 0.04 | 0.01 | 0.04 | 0.01 |
| Evaulation | Post-storage aggregate concentration [aggregates/mL] | 50 | 50 | 80 | 80 | 900 |
| | Concentration of non-ionic surfactant (post-storage concentration) [mg/mL] | 0.01 | 0.03 | 0.01 | 0.03 | 0.01 |
| | Post-storage concentration - Initial concentration concentration change) [mg/mL] | 0.00 | −0.01 | 0.00 | −0.01 | 0.00 |
| | Decomposition product production after storage | No | No | No | No | No |

| | | Example 6 | Example 7 | Example 8 | Example 9 | Example 10 |
|---|---|---|---|---|---|---|
| Barrel | Material (polymer) | Hydrogenated product A | Copolymer B | Copolymer B | Hydrogenated product A | Hydrogenated product A |
| | Pre-drying | No | No | No | Yes | No |
| | Oxygen concentration in resin before shaping (after pre-drying) [mass ppm] | 21 | 21 | 21 | 1.5 | 1.5 |
| | Water contact angle of formulation contacting region [°] | 87 | 88 | 88 | 93 | 93 |
| Protein solution formulation | Type of protein | Adalimumab | Adalimumab | Adalimumab | Infliximab | Infliximab |
| | pH of used buffer solution [—] | 7 | 7 | 7 | 7 | 7 |
| | NaCl concentration of used buffer solution [mM] | 200 | 200 | 200 | 200 | 200 |
| | Concentration of non-ionic surfactant (initial concentration) [mg/mL] | 0.04 | 0.01 | 0.04 | 0.01 | 0.04 |
| Evaulation | Post-storage aggregate concentration [aggregates/mL] | 800 | 1100 | 1000 | 600 | 650 |
| | Concentration of non-ionic surfactant (post-storage concentration) [mg/mL] | 0.03 | 0.01 | 0.03 | 0.01 | 0.03 |
| | Post-storage concentration - Initial concentration concentration change) [mg/mL] | −0.00 | 0.01 | −0.00 | 0.01 | −0.00 |
| | Decomposition product production after storage | No | No | No | No | No |

TABLE 2

|  |  | Example 11 | Example 12 | Example 13 | Example 14 | Example 15 |
|---|---|---|---|---|---|---|
| Barrel | Material (polymer) | Copolymer B | Copolymer B | Hydrogenated product A | Hydrogenated product A | Copolymer B |
|  | Pre-drying | Yes | Yes | No | No | No |
|  | Oxygen concentration in resin before shaping (after pre-drying) [mass ppm] | 4 | 4 | 21 | 21 | 21 |
|  | Water contact angle of formulation contacting region [°] | 94 | 94 | 87 | 87 | 88 |
| Protein solution formulation | Type of protein | Infliximab | Infliximab | Infliximab | Infliximab | Infliximab |
|  | pH of used buffer solution [—] | 7 | 7 | 7 | 7 | 7 |
|  | NaCl concentration of used buffer solution [mM] | 200 | 200 | 200 | 200 | 200 |
|  | Concentration of non-ionic surfactant (initial concentration) [mg/mL] | 0.01 | 0.04 | 0.01 | 0.04 | 0.01 |
| Evaulation | Post-storage aggregate concentration [aggregates/mL] | 850 | 800 | 1500 | 1550 | 1800 |
|  | Concentration of non-ionic surfactant (post-storage concentration) [mg/mL] | 0.01 | 0.03 | 0.01 | 0.03 | 0.01 |
|  | Post-storage concentration - Initial concentration concentration change) [mg/mL] | 0.00 | −0.01 | 0.00 | −0.01 | 0.00 |
|  | Decomposition product production after storage | No | No | No | No | No |

|  |  | Example 16 | Example 17 | Example 18 | Example 19 | Example 20 |
|---|---|---|---|---|---|---|
| Barrel | Material (polymer) | Copolymer B | Hydrogenated product A | Hydrogenated product A | Hydrogenated product A | Hydrogenated product A |
|  | Pre-drying | No | Yes | Yes | Yes | Yes |
|  | Oxygen concentration in resin before shaping (after pre-drying) [mass ppm] | 21 | 1.5 | 1.5 | 1.5 | 1.5 |
|  | Water contact angle of formulation contacting region [°] | 88 | 93 | 93 | 93 | 93 |
| Protein solution formulation | Type of protein | Infliximab | Adalimumab | Adalimumab | Adalimumab | Adalimumab |
|  | pH of used buffer solution [—] | 7 | 7 | 7 | 4 | 5 |
|  | NaCl concentration of used buffer solution [mM] | 200 | 0 | 20 | 200 | 200 |
|  | Concentration of non-ionic surfactant (initial concentration) [mg/mL] | 0.04 | 0.01 | 0.01 | 0.01 | 0.01 |
| Evaulation | Post-storage aggregate concentration [aggregates/mL] | 1600 | 50 | 50 | 80 | 150 |
|  | Concentration of non-ionic surfactant (post-storage concentration) [mg/mL] | 0.03 | 0.01 | 0.01 | 0.01 | 0.01 |
|  | Post-storage concentration - Initial concentration concentration change) [mg/mL] | −0.00 | 0.01 | 0.00 | 0.00 | 0.00 |
|  | Decomposition product production after storage | No | No | No | No | No |

|  |  | Example 21 | Example 22 | Example 23 | Example 24 |
|---|---|---|---|---|---|
| Barrel | Material (polymer) | Hydrogenated product A | Hydrogenated product C | Hydrogenated product C | Hydrogenated product A |
|  | Pre-drying | Yes | Yes | Yes | Yes |
|  | Oxygen concentration in resin before shaping (after pre-drying) [mass ppm] | 1.5 | 1.5 | 1.5 | 1.5 |
|  | Water contact angle of formulation contacting region [°] | 93 | 92 | 91 | 93 |
| Protein solution formulation | Type of protein | Adalimumab | Adalimumab | Adalimumab | Adalimumab |
|  | pH of used buffer solution [—] | 6 | 7 | 7 | 7 |
|  | NaCl concentration of used buffer solution [mM] | 200 | 200 | 200 | 200 |
|  | Concentration of non-ionic surfactant (initial concentration) [mg/mL] | 0.01 | 0.01 | 0.04 | 0.01 |

TABLE 2-continued

| Evaulation | Post-storage aggregate concentration [aggregates/mL] | 80 | 50 | 50 | 50 |
|---|---|---|---|---|---|
| | Concentration of non-ionic surfactant (post-storage concentration) [mg/mL] | 0.01 | 0.01 | 0.03 | 0.01 |
| | Post-storage concentration - Initial concentration concentration change) [mg/mL] | 0.00 | 0.01 | −0.00 | 0.00 |
| | Decomposition product production after storage | No | No | No | No |

*Stabilizer used during resin pellet production in Example 24

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Barrel | Material (polymer) | Hydrogenated product A | Hydrogenated product A | Copolymer B | Copolymer B | Hydrogenated product A | Hydrogenated product A |
| | Pre-drying | Yes | Yes | Yes | Yes | No | No |
| | Oxygen concentration in resin before shaping (after pre-drying) [mass ppm] | 1.5 | 1.5 | 4 | 4 | 21 | 21 |
| | Water contact angle of formulation contacting region [°] | 93 | 93 | 94 | 94 | 87 | 87 |
| Protein solution formulation | Type of protein | Adalimumab | Adalimumab | Adalimumab | Adalimumab | Adalimumab | Adalimumab |
| | pH of used buffer solution [—] | 7 | 7 | 7 | 7 | 7 | 7 |
| | NaCl concentration of used buffer solution [mM] | 200 | 200 | 200 | 200 | 200 | 200 |
| | Concentration of non-ionic surfactant (initial concentration) [mg/mL] | 0.50 | 1.00 | 0.50 | 1.00 | 0.50 | 1.00 |
| Evaulation | Post-storage aggregate concentration [aggregates/mL] | 50 | 40 | 80 | 70 | 800 | 800 |
| | Concentration of non-ionic surfactant (post-storage concentration) [mg/mL] | 0.42 | 0.83 | 0.43 | 0.86 | 0.40 | 0.80 |
| | Post-storage concentration - Initial concentration concentration change) [mg/mL] | −0.08 | −0.17 | −0.07 | −0.14 | −0.10 | −0.20 |
| | Decomposition product production after storage | Yes | Yes | Yes | Yes | Yes | Yes |

| | | Comparative Example 7 | Comparative Example 8 | Comparative Example 9 | Comparative Example 10 | Comparative Example 11 | Comparative Example 12 |
|---|---|---|---|---|---|---|---|
| Barrel | Material (polymer) | Copolymer B | Copolymer B | Glass | Glass | Glass | Glass |
| | Pre-drying | No | No | — | — | — | — |
| | Oxygen concentration in resin before shaping (after pre-drying) [mass ppm] | 21 | 21 | — | — | — | — |
| | Water contact angle of formulation contacting region [°] | 88 | 88 | 64 | 64 | 64 | 64 |
| Protein solution formulation | Type of protein | Adalimumab | Adalimumab | Adalimumab | Adalimumab | Adalimumab | Adalimumab |
| | pH of used buffer solution [—] | 7 | 7 | 7 | 7 | 7 | 7 |
| | NaCl concentration of used buffer solution [mM] | 200 | 200 | 200 | 200 | 200 | 200 |
| | Concentration of non-ionic surfactant (initial concentration) [mg/mL] | 0.50 | 1.00 | 0.01 | 0.05 | 0.50 | 1.00 |
| Evaulation | Post-storage aggregate concentration [aggregates/mL] | 1000 | 950 | 4300 | 4000 | 3500 | 3000 |
| | Concentration of non-ionic surfactant (post-storage concentration) [mg/mL] | 0.42 | 0.84 | 0.01 | 0.04 | 0.38 | 0.76 |
| | Post-storage concentration - Initial concentration concentration change) [mg/mL] | −0.08 | −0.16 | 0.00 | −0.01 | −0.12 | −0.24 |
| | Decomposition product production after storage | Yes | Yes | No | No | Yes | Yes |

TABLE 4

|  |  | Comparative Example 13 | Comparative Example 14 | Comparative Example 15 | Comparative Example 16 | Comparative Example 17 | Comparative Example 18 |
|---|---|---|---|---|---|---|---|
| Barrel | Material (polymer) | Hydrogenated product A | Hydrogenated product A | Copolymer B | Copolymer B | Hydrogenated product A | Hydrogenated product A |
|  | Pre-drying | Yes | Yes | Yes | Yes | No | No |
|  | Oxygen concentration in resin before shaping (after pre-drying) [mass ppm] | 1.5 | 1.5 | 4 | 4 | 21 | 21 |
|  | Water contact angle of formulation contacting region [°] | 93 | 93 | 94 | 94 | 87 | 87 |
| Protein solution formulation | Type of protein | Infliximab | Infliximab | Infliximab | Infliximab | Infliximab | Infliximab |
|  | pH of used buffer solution [—] | 7 | 7 | 7 | 7 | 7 | 7 |
|  | NaCl concentration of used buffer solution [mM] | 200 | 200 | 200 | 200 | 200 | 200 |
|  | Concentration of non-ionic surfactant (initial concentration) [mg/mL] | 0.50 | 1.00 | 0.50 | 1.00 | 0.50 | 1.00 |
| Evaulation | Post-storage aggregate concentration [aggregates/mL] | 600 | 550 | 800 | 750 | 1500 | 1500 |
|  | Concentration of non-ionic surfactant (post-storage concentration) [mg/mL] | 0.42 | 0.83 | 0.43 | 0.86 | 0.40 | 0.80 |
|  | Post-storage concentration - Initial concentration change) [mg/mL] | −0.08 | −0.17 | −0.07 | −0.14 | −0.10 | −0.20 |
|  | Decomposition product production after storage | Yes | Yes | Yes | Yes | Yes | Yes |

|  |  | Comparative Example 19 | Comparative Example 20 | Comparative Example 21 | Comparative Example 22 | Comparative Example 23 | Comparative Example 24 |
|---|---|---|---|---|---|---|---|
| Barrel | Material (polymer) | Copolymer B | Copolymer B | Glass | Glass | Glass | Glass |
|  | Pre-drying | No | No | — | — | — | — |
|  | Oxygen concentration in resin before shaping (after pre-drying) [mass ppm] | 21 | 21 | — | — | — | — |
|  | Water contact angle of formulation contacting region [°] | 88 | 88 | 64 | 64 | 64 | 64 |
| Protein solution formulation | Type of protein | Infliximab | Infliximab | Infliximab | Infliximab | Infliximab | Infliximab |
|  | pH of used buffer solution [—] | 7 | 7 | 7 | 7 | 7 | 7 |
|  | NaCl concentration of used buffer solution [mM] | 200 | 200 | 200 | 200 | 200 | 200 |
|  | Concentration of non-ionic surfactant (initial concentration) [mg/mL] | 0.50 | 1.00 | 0.01 | 0.05 | 0.50 | 1.00 |
| Evaulation | Post-storage aggregate concentration [aggregates/mL] | 1700 | 1600 | 7000 | 7000 | 5000 | 4000 |
|  | Concentration of non-ionic surfactant (post-storage concentration) [mg/mL] | 0.42 | 0.84 | 0.01 | 0.04 | 0.38 | 0.76 |
|  | Post-storage concentration - Initial concentration change) [mg/mL] | −0.08 | −0.16 | 0.00 | −0.01 | −0.12 | −0.24 |
|  | Decomposition product production after storage | Yes | Yes | No | No | Yes | Yes |

It can be seen from Tables 1 and 2 that the pre-filled syringes of Examples 1 to 24, which were each obtained by filling a protein solution formulation having a non-ionic surfactant concentration of more than 0 mg/mL and less than 0.05 mg/mL into a barrel formed of a resin containing a hydrogenated cycloolefin ring-opened polymer and/or a copolymer of a cycloolefin and a chain olefin, could inhibit protein aggregation in the protein solution formulation and limit the produced amount of a decomposition product of the non-ionic surfactant to a low level in a situation in which the pre-filled syringe was stored for a long time.

On the other hand, it can be seen from Tables 3 and 4 that the pre-filled syringes of Comparative Examples 1 to 8 and 13 to 20 in which a protein solution formulation having a non-ionic surfactant concentration of 0.05 mg/mL or more was used could not limit the produced amount of a decomposition product of the non-ionic surfactant to a low level after long-term storage.

It can also be seen from Tables 3 and 4 that protein aggregation after long-term storage could not be inhibited in the pre-filled syringes of Comparative Examples 9 to 12 and 21 to 24 in which a barrel formed of glass was used.

INDUSTRIAL APPLICABILITY

According to the present disclosure, it is possible to provide a pre-filled syringe that can inhibit protein aggregation in a protein solution formulation while also reducing the produced amount of a decomposition product of a non-ionic surfactant after long-term storage.

Moreover, according to the present disclosure, it is possible to provide a method of producing a pre-filled syringe that can inhibit protein aggregation in a protein solution formulation while also reducing the produced amount of a decomposition product of a non-ionic surfactant after long-term storage.

REFERENCE SIGNS LIST 1 pre-filled syringe
10 barrel
11 tip
12 nozzle
13 inner wall surface
14 formulation contacting region
15 barrel main body
16 flange
20 sealing member (cap)
30 gasket
40 plunger
41 thumb pad
50 protein solution formulation

The invention claimed is:

1. A pre-filled syringe comprising:
a barrel including a nozzle at a tip thereof:
a sealing member sealing the nozzle;
a gasket slidably housed inside the barrel:
a plunger linked to the gasket and performing a movement operation of the gasket in a longitudinal direction of the barrel; and
a protein solution formulation filled into a space defined by the sealing member, the gasket, and a region that is part of an inner wall surface of the barrel, wherein
the barrel is formed of a resin, formable by the resin having oxygen concentration of 10 mass ppm or less, including at least one cycloolefin monomer unit selected from a group including a tetracyclo [$7.4.0.0^{2,7}0.1^{10,13}$]trideca-2,4,6,11-tetraene monomer unit, a bicyclo[2.2.1]hept-2-ene monomer unit, and a 8-ethyl-tetracyclo[$4.4.0.1^{2,5}0.1^{7,10}$]dodec-3-ene monomer unit, and
the protein solution formulation has a non-ionic surfactant concentration of more than 0 mg/mL and less than 0.05 mg/mL.

2. The pre-filled syringe according to claim 1, wherein the region that is part of the inner wall surface has a water contact angle of 90° or more.

3. The pre-filled syringe according to claim 1, wherein the protein solution formulation contains either or both of an antibody and an antigen binding fragment of the antibody.

4. The pre-filled syringe according to claim 3, wherein the antibody is at least one selected from the group consisting of chimeric antibodies, human antibodies, humanized antibodies, and domain antibodies of any thereof.

5. The pre-filled syringe according to claim 1, wherein the protein solution formulation contains at least one selected from the group consisting of ofatumumab, cetuximab, tocilizumab, bevacizumab, canakinumab, golimumab, ustekinumab, eculizumab, omalizumab, trastuzumab, pertuzumab, adalimumab, denosumab, mogamulizumab, rituximab, ranibizumab, infliximab, aflibercept, abatacept, etanercept, gemtuzumab ozogamicin, panitumumab, basiliximab, certolizumab pegol, and palivizumab.

6. A method of producing a pre-filled syringe having a protein solution formulation filled into an inner part of a syringe that includes: a barrel including a nozzle at a tip thereof: a sealing member sealing the nozzle; a gasket slidably housed inside the barrel; and a plunger linked to the gasket and performing a movement operation of the gasket in a longitudinal direction of the barrel, the method of producing a pre-filled syringe comprising:
pre-drying the resin so as to obtain the resin having an oxygen concentration of 10 mass ppm or less:
shaping the resin after the pre-drying to obtain the barrel; and
loading a protein solution formulation having a non-ionic surfactant concentration of more than 0 mg/mL and less than 0.05 mg/mL into a barrel that is formed of a resin including at least one cycloolefin monomer unit selected from a group including a tetracyclo [$7.4.0.0^{2,7}0.1^{10,13}$]trideca-2,4,6,11-tetraene monomer unit, a bicyclo[2.2.1]hept-2-ene monomer unit, and a 8-ethyl-tetracyclo[$4.4.0.1^{2,5}0.1^{7,10}$]dodec-3-ene monomer unit to obtain a pre-filled syringe having the protein solution formulation filled into a space defined by the sealing member the gasket, and a region that is part of an inner wall surface of the barrel.

7. The method of producing a pre-filled syringe according to claim 6, wherein the region that is part of the inner wall surface has a water contact angle of 90° or more.

8. The method of producing a pre-filled syringe according to claim 6, wherein the pre-drying is performed in an inert gas atmosphere.

9. The method of producing a pre-filled syringe according to claim 6, wherein the pre-drying has a drying temperature of not lower than 80° C. and not higher than 120° C.

10. The method of producing a pre-filled syringe according to claim 6, wherein the protein solution formulation contains either or both of an antibody and an antigen binding fragment of the antibody.

11. The method of producing a pre-filled syringe according to claim 10, wherein the antibody is at least one selected from the group consisting of chimeric antibodies, human antibodies, humanized antibodies, and domain antibodies of any thereof.

12. The method a producing a pre-filled syringe according to claim 6, wherein the protein solution formulation contains at least one selected from the group consisting of ofatumumab, cetuximab, tocilizumab, bevacizumab, canakinumab, golimumab, ustekinumab, eculizumab, omalizumab, trastuzumab, pertuzumab, adalimumab, denosumab, mogamulizumab, rituximab, ranibizumab, infliximab, aflibercept, abatacept, etanercept, gemtuzumab ozogamicin, panitumumab, basiliximab, certolizumab pegol, and palivizumab.

* * * * *